(12) United States Patent
Filippov et al.

(10) Patent No.: US 12,108,077 B2
(45) Date of Patent: Oct. 1, 2024

(54) METHOD AND APPARATUS OF MODE- AND SIZE-DEPENDENT BLOCK-LEVEL RESTRICTIONS FOR POSITION DEPENDENT PREDICTION COMBINATION

(71) Applicant: Huawei Technologies Co., Ltd., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/352,012

(22) Filed: Jun. 18, 2021

(65) Prior Publication Data
US 2022/0124368 A1      Apr. 21, 2022

Related U.S. Application Data

(63) Continuation of application No. PCT/RU2019/050253, filed on Dec. 23, 2019.
(Continued)

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11); *H04N 19/132* (2014.11); *H04N 19/176* (2014.11)

(58) Field of Classification Search
None
See application file for complete search history.

(56) References Cited

U.S. PATENT DOCUMENTS 8,503,536 B2   8/2013   Zuo et al.
9,794,557 B2   10/2017  Hsu et al.
(Continued)

FOREIGN PATENT DOCUMENTS

CN   101573982 A   11/2009
CN   102291584 A   12/2011
(Continued)

OTHER PUBLICATIONS

Zhou Yun et al, Study on the Development of Video Coding Standard VVC, Content Production and Broadcasting, 2018, with an Englsih Abstract, 6 pages.
(Continued)

*Primary Examiner* — Chikaodili E Anyikire
(74) *Attorney, Agent, or Firm* — WOMBLE BOND DICKINSON (US) LLP

(57) ABSTRACT

A method of intra predicting a block of a picture, comprising determining a predicted sample value from one or more reference sample values by intra-prediction using an intra prediction mode selected from one of a DC intra-prediction mode, a planar intra prediction mode, or an angular intra-prediction mode; determining a first and second weights based on the intra prediction mode and one of a height of the block, a width of the block, or both; calculating an additional value as a weighted sum of a top reference sample value and a left reference sample value; multiplying the predicted sample value by a sample weighting factor, resulting in a weighted predicted sample value; adding the additional value to the weighted predicted sample value, resulting in a non-normalized modified predicted sample value; and normalizing the non-normalized modified predicted sample value.

17 Claims, 16 Drawing Sheets

Related U.S. Application Data

(60) Provisional application No. 62/784,345, filed on Dec. 21, 2018.

(51) Int. Cl.
*H04N 19/11* (2014.01)
*H04N 19/132* (2014.01)
*H04N 19/176* (2014.01)

(56) References Cited

U.S. PATENT DOCUMENTS

| | | | |
|---|---|---|---|
| 10,491,893 B1* | 11/2019 | Zhao | H04N 19/593 |
| 11,057,622 B2* | 7/2021 | Van der Auwera | H04N 19/593 |
| 2005/0254584 A1 | 11/2005 | Kim et al. | |
| 2007/0248163 A1 | 10/2007 | Zuo et al. | |
| 2007/0248164 A1 | 10/2007 | Zuo et al. | |
| 2011/0206135 A1 | 8/2011 | Drugeon et al. | |
| 2011/0255595 A1 | 10/2011 | Zuo et al. | |
| 2017/0094285 A1* | 3/2017 | Said | H04N 19/159 |
| 2017/0272748 A1 | 9/2017 | Seregin et al. | |
| 2018/0176587 A1 | 6/2018 | Panusopone et al. | |
| 2020/0162737 A1* | 5/2020 | Van der Auwera | H04N 19/117 |
| 2020/0359037 A1* | 11/2020 | Ramasubramonian | H04N 19/176 |

FOREIGN PATENT DOCUMENTS

| | | |
|---|---|---|
| CN | 102695061 A | 9/2012 |
| CN | 104137549 A | 11/2014 |
| CN | 104780364 A | 7/2015 |
| CN | 107071417 A | 8/2017 |
| CN | 108028931 A | 5/2018 |
| CN | 108141608 A | 6/2018 |
| GB | 2577337 A | 3/2020 |
| JP | 2006270437 A | 10/2006 |
| JP | 2019509684 A | 4/2019 |
| WO | 2017165391 A1 | 9/2017 |
| WO | 2017214920 A1 | 12/2017 |

OTHER PUBLICATIONS

Document: JVET-J0069_r1, Geert Van der Auwera et al, Extension of Simplified PDPC to Diagonal Intra Modes, Joint Video Experts Team (JVET) of ITU-T SG 16 WP 3 and ISO/IEC JTC 1/SC 29/WG 11, 10th Meeting: San Diego, USA, Apr. 10-20, 2018, 5 pages.

Benjamin Bross et al, Versatile Video Coding (Draft 2), Document: JVET-K1001-v6, Joint Video Experts Team (JVET) of ITU-T SG 16 WP 3 and ISO/IEC JTC 1/SC 29/WG 11, 11th Meeting: Ljubljana, SI, Jul. 10-18, 2018, 141 pages.

Geert Van Der Auwera et al: "Description of Core Experiment 3(CE3): Intra Prediction and Mode Coding", 10. JVET Meeting; Apr. 10, 2018-Apr. 20, 2018; San Diego; (The Joint Video Exploration Team OF ISO/IEC JTC1/SC29/WG11 and ITU-T SG.16 ), No. JVET-J1023 Apr. 20, 2018 (Apr. 20, 2018), pp. 1-44, XP030151316, Retrieved from the Internet:URL:http://phenix.int-evry.fr/jvet/doc_end_user/documents/1O_San%20Diego/wg11/JVET-J1023-v1.zip JVET-J1023.docx [retrieved onApr. 20, 2018].

Van Der Auwera (Qualcomm) G et al: "Extension of SimplifiedPDPC to Diagonal Intra Modes", 122. MPEG Meeting; Apr. 16, 2018-Apr. 20, 2018; San Diego; (Motion Picture Expert Group or ISO/IEC JTC1/SC29/WG11), No. m42411 Apr. 14, 2018 (Apr. 14, 2018), XP030261726, Retrieved from the Internet: URL:http://phenix.int-evry.fr/mpeg/doc_end_user/documents/122_San.

Document: JVET-J1023_r2, Geert Van der Auwera et al, Description of Core Experiment 3: Intra Prediction and Mode Coding, Joint Video Experts Team (JVET) of ITU-T SG 16 WP 3 and ISO/IEC JTC 1/SC 29/WG 11, 10th Meeting: San Diego, USA, Apr. 10-20, 2018, 49 pages.

Document: JVET-C0040-r3, F. Galpin et al, Adaptive Clipping in JEM2.0, Joint Video Exploration Team (JVET) of ITU-T SG 16 WP 3 and ISO/IEC JTC 1/SC 29/WG 11, 3rd Meeting: Geneva, CH, May 26-Jun. 1, 2016, total 7 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Geert Van der Auwera, et.al., Description of Core Experiment 3: Intra Prediction and Mode Coding, Joint Video Experts Team (JVET) of ITU-T SG 16 WP 3 and ISO/IEC JTC 1/SC 29/WG 11 10th Meeting: San Diego, USA, Apr. 10-20, 2018, [JVET-J1023], Apr. 20, 2018, pp. 1-44.

Benjamin Bross, et.al., Versatile Video Coding (Draft 3), Joint Video Experts Team (JVET) of ITU-T SG 16 WP 3 and ISO/IEC JTC 1/SC 29/WG 1112th Meeting: Macao, CN, Oct. 3-12, 2018, [JVET-L1001-v6], Dec. 14, 2018, pp. i-iii, pp. 1-195.

Jinho Lee, et.al., CE3-related: Simplification of PDPC Joint Video Experts Team (JVET) of ITU-T SG 16 WP 3 and ISO/IEC JTC 1/SC 29/WG 11 12th Meeting: Macao, CN, Oct. 3-12, 2018, [JVET-L0152-v3], Oct. 7, 2018, pp. 1-7.

Alexey Filippov, et.al., Non-CE3: On block size restrictions for PDPC with disabled linear filtering for PDPC in the case of skew non-diagonal modes, Joint Video Experts Team (JVET) of ITU-T SG 16 WP 3 and ISO/IEC JTC 1/SC 29/WG 11 13th Meeting: Marrakech, MA, Jan. 9-18, 2019, [JVET-M0832-v1], Jan. 2019, pp. 1-4.

Document: JVET-L1001-v9, Benjamin Bross et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 235 pages.

* cited by examiner

DC mode PDPC weights for (0, 0) and (1, 0) positions inside one 4x4 block.

METHOD AND APPARATUS OF MODE- AND SIZE-DEPENDENT BLOCK-LEVEL RESTRICTIONS FOR POSITION DEPENDENT PREDICTION COMBINATION

CROSS-REFERENCE TO RELATED APPLICATIONS

This application is a continuation of International Application No. PCT/RU2019/050253, filed on Dec. 23, 2019, which claims priority of U.S. Provisional Patent Application No. 62/784,345, filed Dec. 21, 2018, the disclosures of which are incorporated herein by reference in their entireties.

TECHNICAL FIELD

Embodiments of the present application generally relate to the field of picture processing and more particularly to intra-prediction with a position dependent prediction combination.

BACKGROUND

Video coding (video encoding and decoding) is used in a wide range of digital video applications, for example broadcast digital TV, video transmission over Internet and mobile networks, real-time conversational applications such as video chat, video conferencing, DVD and Blu-ray discs, video content acquisition and editing systems, and camcorders of security applications. The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

In view of the above-discussed problems the present disclosure provides a solution to mitigate or resolve the above-mentioned problem.

Embodiments of the present application provide apparatuses and methods for intra predicting a block of a picture according to the independent claims.

The foregoing and other objects are achieved by the subject matter of the independent claims. Further implementation forms are apparent from the dependent claims, the description and the figures.

The present disclosure provides:

A method of intra predicting a block of a picture, comprising for a sample from a plurality of samples of the block:

determining a predicted sample value from one or more reference sample values by intra-prediction using an intra prediction mode selected from one of a DC intra-prediction mode, a planar intra prediction mode, and an angular intra-prediction mode:

determining a first weight based on the intra prediction mode and one of the height of the block, the width of the block, or both;

determining a second weight based on the intra prediction mode and one of the height of the block, the width of the block, or both:

calculating an additional value as a weighted sum of a top reference sample value and a left reference sample value by weighting the top reference sample value with the first weight and the left reference sample value with the second weight:

multiplying the predicted sample value by a sample weighting factor, resulting in a weighted predicted sample value:

adding the additional value to the weighted predicted sample value, resulting in a non-normalized modified predicted sample value; and normalizing the non-normalized modified predicted sample value by an arithmetic right shift of an integer representation of the non-normalized modified predicted sample value, resulting in a normalized modified predicted sample value.

In an embodiment, the first weight and the second weight may be different.

In an embodiment, the method comprises intra predicting the block for the picture, comprising each sample of the plurality of samples of the block.

In an embodiment, determining the first weight and determining the second weight comprises determining a scaling factor based on the intra prediction mode and one of the height of the block, the width of the block, or both; wherein the first weight and the second weight are determined based on the scaling factor, respectively.

In an embodiment, determining the first weight comprises determining a vertical scaling factor, denoted nScaleY, based on the height of the block and the intra prediction mode, wherein the first weight is determined based on the vertical scaling factor, nScaleY:

determining the second weight comprises determining a horizontal scaling factor, denoted, nScaleX, based on the width of the block and the intra prediction mode, wherein the second weight is determined based on the horizontal scaling factor, nScaleX.normalizing the non-normalized predicted sample value by an arithmetic right shift of an integer representation of the non-normalized predicted sample value, resulting in a normalized predicted sample value.

Here, the determining of the first weight comprises determining a vertical scaling factor, whereas determining of the second weight comprises determining a horizontal scaling factor, where it should be understood that depending on the type of the intra prediction modes these factors may be different.

In an embodiment, nScaleX and nScaleY are derived depending on a mode class index, respectively, wherein the mode class index is derived using a group of intra prediction modes.

In an embodiment, the mode class index is mapped to the specific group of intra prediction modes according to one of the following tables:

| Group of intra prediction modes | 2, DC_IDX, HOR_IDX, | VDIA_IDX | Other modes |
|---|---|---|---|
| Class index | 1 | 2 | 0 | or

| Group of intra prediction modes | DC_IDX, HOR_IDX, VER_IDX | 2, VDIA_IDX | Other modes |
|---|---|---|---|
| Class index | 1 | 2 | 0 | or

| Group of intra prediction modes | DC_IDX, HOR_IDX, VER_IDX | 2, VDIA_IDX | Other modes |
|---|---|---|---|
| Class index | 2 | 1 | 0 | or

| Group of intra prediction modes | DC_IDX, HOR_IDX, VER_IDX | Diagonal modes with integer subpixel step: −14 −12 −10 −6, 2, VDIA_IDX, 72, 76, 78, 80 | Other modes |
|---|---|---|---|
| Class index | 2 | 1 | 0 | where DC_IDX stands for DC mode that has intra prediction mode index of 1, HOR_IDX and VER_IDX stand for horizontal and vertical modes that have intra prediction mode indices of 18 and 50, respectively, VDIA_IDX stands for diagonal mode that has intra prediction mode index of 66.

Here, different mappings of groups of intra prediction modes to different classes are shown.

In an embodiment, nScaleX and nScaleY are derived according to the following mapping:

| Class index | Derivation method |
|---|---|
| 0 | nScaleX = (Log2(nTbW) − 2 + 1) >> 1<br>nScaleY = (Log2(nTbH) − 2 + 1) >> 1 |
| 1 | nScaleY = nScaleX = (Log2(nTbH) + Log2(nTbW)) > 6 ? 1: 0 |
| 2 | nScaleX = Log2(nTbW) > 3 ? 1: 0<br>nScaleY = Log2(nTbH) > 3 ? 1: 0 | where nTbW and nTbH denote width and height of the predicted block, respectively, and ">>" denotes a right-shift operation;

where Floor is the floor function, Log 2 returns the natural logarithm of a number to the base 2, Min returns the smallest of its arguments, and ">>" denotes a right-shift operation.

In an embodiment, the mode class index is mapped to the specific group of intra prediction modes according to the following table:

| Group of intra prediction modes | predModeIntra > 50 | predModeIntra < 18 && predModeIntra! = 0 && predModeIntra! = 1 | Other modes |
|---|---|---|---|
| Class index | 1 | 2 | 0 |

In an embodiment, nScaleX and nScaleY are derived according to the following mapping:

| Class index | Derivation method |
|---|---|
| 0 | nScaleY = nScaleX = (Log2(nTbH) + Log2(nTbW) − 2) >> 2 |
| 1 | nScaleY = nScaleX = Min(2, Log2(nTbH) − Floor(Log2(3 * invAngle − 2)) + 8) |
| 2 | nScaleY = nScaleX = Min(2, Log2(nTbW) − Floor(Log2(3 * invAngle − 2)) + 8) Log2(nTbH) > 3 ? 1: 0 | where nTbW and nTbH denote width and height of the predicted block, respectively, and ">>" denotes a right-shift operation;

where Floor is the floor function, Log 2 returns the natural logarithm of a number to the base 2, Min returns the smallest of its arguments, and ">>" denotes a right-shift operation; wherein invAngle is the inverse angle parameter which is derived using intraPredAngle as follows:

$$invAngle = \text{Round}\left(\frac{512*32}{intraPredAngle}\right);$$

wherein intraPredAngle is the angle parameter which is derived from the intra prediction mode, given by the variable predModeIntra, using a lookup table (LUT).

In an embodiment, the LUT is given by the following table

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |

-continued

| predMode Intra | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|
| intraPred Angle | 23 | 20 | 18 | 16 | 14 | 12 | 10 | 8 | 6 | 4 | 3 | 2 | 1 | 0 | −1 | −2 | −3 |
| predMode Intra | 22 | 23 | 24 | 25 | 26 | 27 | 28 | 29 | 30 | 31 | 32 | 33 | 34 | 35 | 36 | 37 | 38 |
| intraPred Angle | −4 | −6 | −8 | −10 | −12 | −14 | −16 | −18 | −20 | −23 | −26 | −29 | −32 | −29 | −26 | −23 | −20 |
| predMode Intra | 39 | 40 | 41 | 42 | 43 | 44 | 45 | 46 | 47 | 48 | 49 | 50 | 51 | 52 | 53 | 54 | 55 |
| intraPred Angle | −18 | −16 | −14 | −12 | −10 | −8 | −6 | −4 | −3 | −2 | −1 | 0 | 1 | 2 | 3 | 4 | 6 |
| predMode Intra | 56 | 57 | 58 | 59 | 60 | 61 | 62 | 63 | 64 | 65 | 66 | 67 | 68 | 69 | 70 | 71 | 72 |
| intraPred Angle | 8 | 10 | 12 | 14 | 16 | 18 | 20 | 23 | 26 | 29 | 32 | 35 | 39 | 45 | 51 | 57 | 64 |
| predMode Intra | 73 | 74 | 75 | 76 | 77 | 78 | 79 | 80 | | | | | | | | | |
| intraPred Angle | 73 | 86 | 102 | 128 | 171 | 256 | 341 | 512 | | | | | | | | | |

In an embodiment, normalizing the non-normalized modified predicted sample value comprises computing the predicted sample value as $$P(x,y) = \text{Clip1Cmp}((wL \times R_{-1,y} + wT \times R_{x,-1} - wTL \times R_{-1,-1} + (64 - wL - wT + wTL) \times P(x,y) + 32)) >> 6)$$

where

P(x,y) is the non-normalized modified predicted sample value, $R_{x,-1}$, $R_{-1,y}$ represent the values of the nearest reference samples located above and to the left of the each sample, $wL = V >> ((x << 1) >> nScaleX)$ is a horizontal weighting factor, $wT = V >> ((y << 1) >> nScaleY)$ is a vertical weighting factor, V is a base value:

x is a horizontal coordinate of the each sample, and y is a vertical coordinate of the sample:

where clip1Cmp is set as follows:

in case cIdx is equal to 0, clip1Cmp is set equal to Clip1Y:

otherwise, clip1Cmp is set equal to Clip1C:

where cIdx is a variable specifying the color component of the current block; and $$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

where $\text{BitDepth}_Y$ is the bit depth of luma samples.

where $\text{BitDepth}_C$ is the bit depth of luma samples.

In an embodiment, for a planar mode, wTL=0, while for the horizontal mode wTL=wT and for vertical mode wTL=wL.

In an embodiment, normalizing the non-normalized modified predicted sample value comprises computing the normalized modified predicted sample value as $$\hat{P}(x,y) = (wL \times R_{-1,y} + wT \times R_{x,-1} + (64 - wL - wT) \times P(x,y) + 32)) >> 6$$

where $\hat{P}(x,y)$ is the normalized modified predicted sample value,

P(x,y) is the non-normalized modified predicted sample value, $R_{x,-1}$, $R_{-1,y}$ represent the values of the nearest reference samples located above and to the left of the each sample, $wL = V >> ((x << 1) >> nScaleX)$ is a horizontal weighting factor, $wT = V >> ((y << 1) >> nScaleY)$ is a vertical weighting factor, x is a horizontal coordinate of the each sample, and y is a vertical coordinate of the sample.

In an embodiment, each sample is not updated if a sum of a width of the block and a height of the block, given in samples, respectively, is greater than 64 samples, and either the intra prediction mode is skew non-diagonal or is the intra prediction mode is a planar intra prediction mode.

In an embodiment, intraPredMode is skew non-diagonal if intraPredMode is not equal to 2 or VDIA_IDX and one of the following is true: intraPredMode is not less than VDIA_IDX−numModes or intraPredMode is not greater than 2+numModes.

In an embodiment, the picture is part of a video sequence.

In an embodiment, the method further comprises:

adding a residual value to the normalized modified predicted sample value, resulting in a reconstructed sample value.

The present disclosure further provides an encoder comprising processing circuitry for carrying out the method according to any preceding embodiment or aspect.

The present disclosure further provides a decoder comprising processing circuitry for carrying out the method according to any preceding embodiment or aspect.

The present disclosure further provides a computer program comprising a program code for performing the method according to any preceding embodiment or aspect.

The present disclosure may further provide a computer program product comprising a program code for performing the method according to any preceding embodiment or aspect.

The present disclosure further provides a decoder, comprising:

one or more processors; and
a non-transitory computer-readable storage medium coupled to the processors and storing programming for execution by the processors, wherein the programming, when executed by the processors, configures the decoder to carry out the method according to any preceding embodiment or aspect.

The present disclosure further provides an encoder, comprising:

one or more processors; and
a non-transitory computer-readable storage medium coupled to the processors and storing programming for execution by the processors, wherein the programming, when executed by the processors, configures the encoder to carry out the method according to any preceding embodiment or aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the application are described in more detail with reference to the attached figures and drawings, in which.

Figure 1A:
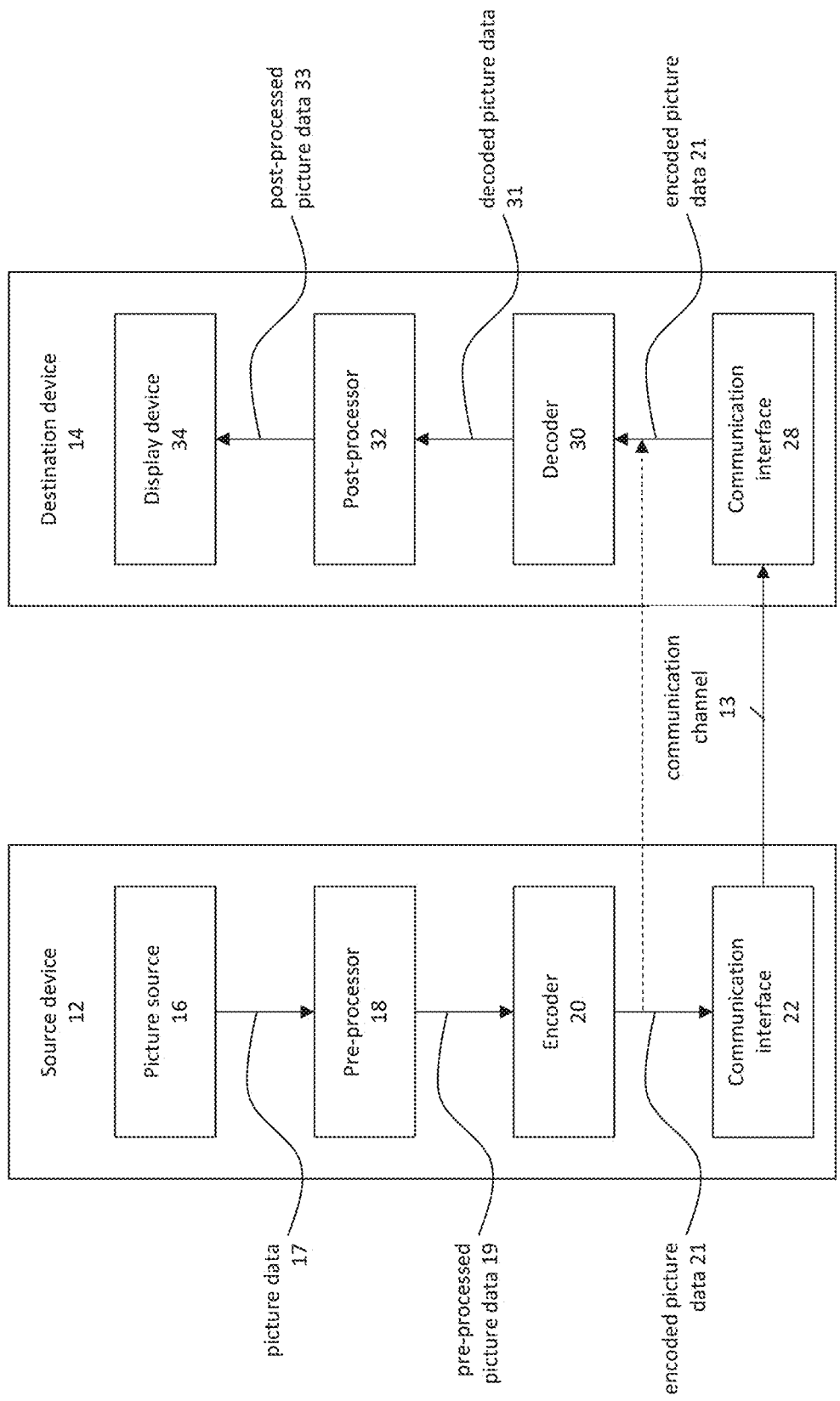
FIG. 1A schematically illustrates an example of a video coding system according to an embodiment.

In the following identical reference signs refer to identical or at least functionally equivalent features if not explicitly specified otherwise.

DETAILED DESCRIPTION

In the following description, reference is made to the accompanying figures, which form part of the disclosure, and which show, by way of illustration, specific aspects of embodiments of the invention or specific aspects in which embodiments of the invention may be used. It is understood that embodiments of the invention may be used in other aspects and comprise structural or logical changes not depicted in the figures. The following detailed description, therefore, is not to be taken in a limiting sense, and the scope of the invention is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g., functional units, to perform the described one or plurality of method operations (e.g., one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g., functional units, a corresponding method may include one operation to perform the functionality of the one or plurality of units (e.g., one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

In the following embodiments of a video coding system, a video encoder and a video decoder are described based on FIGS. 1 to 3.

FIG. 1A is a schematic block diagram illustrating an example coding system according to an embodiment. In FIG. 1A, coding system 10, e.g., a video coding system, may utilize techniques of this present application. Video encoder (or encoder) 20 and video decoder (or decoder) 30 of coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 21.

The source device 12 comprises an encoder 20, and may additionally, i.e. optionally, comprise a picture source 16, a pre-processor (or pre-processing unit) 18, e.g., a picture pre-processor, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder), and may additionally, i.e. optionally, comprise a communication interface or communication unit 28, a post-processor (or post-processing unit) 32 and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data (or decoded picture) 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
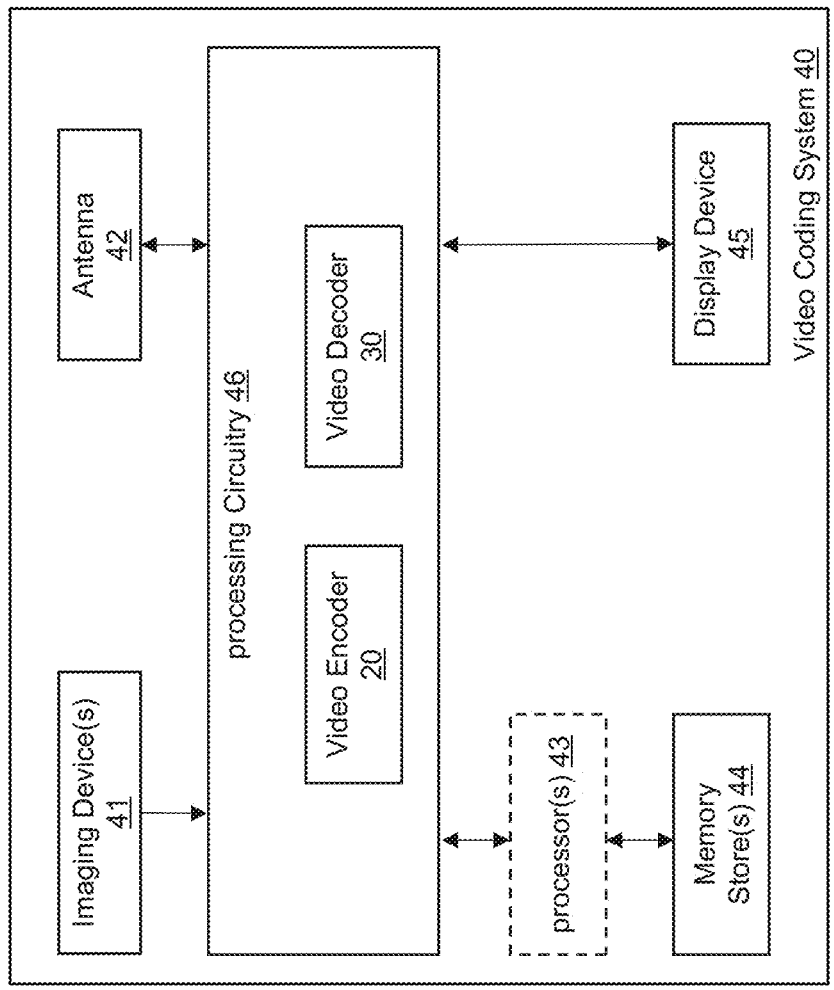
FIG. 1B schematically illustrates another example of a video coding system according to an embodiment.

The encoder 20 (e.g., a video encoder) or the decoder 30 (e.g., a video decoder) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
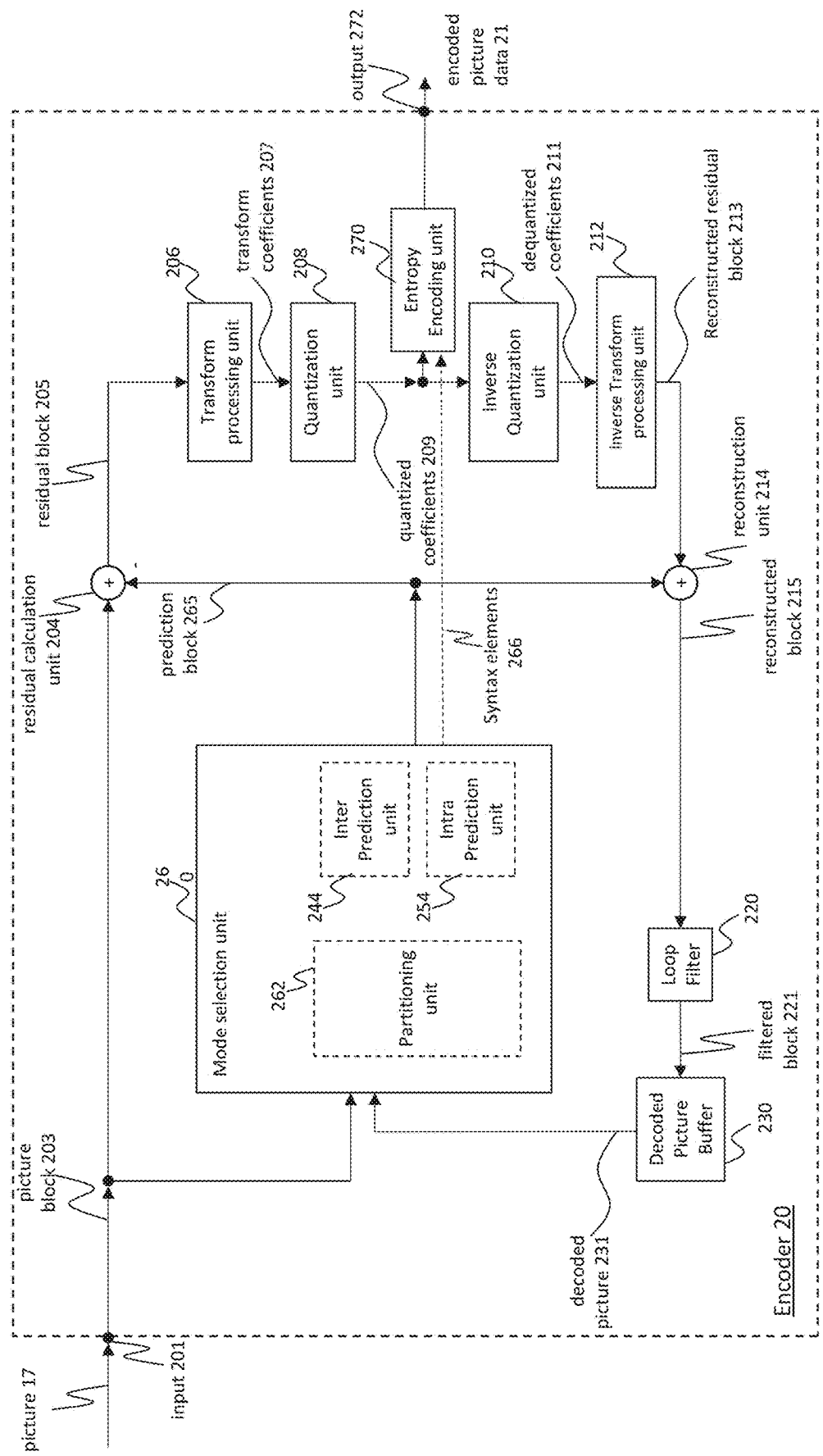
FIG. 2 schematically illustrates an example of a video encoder according to an embodiment.

FIG. 2 shows a schematic block diagram of an example video encoder according to an embodiment. In the example of FIG. 2, video encoder 20 comprises an input (or input interface) 201, a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output (or output interface) 272. The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
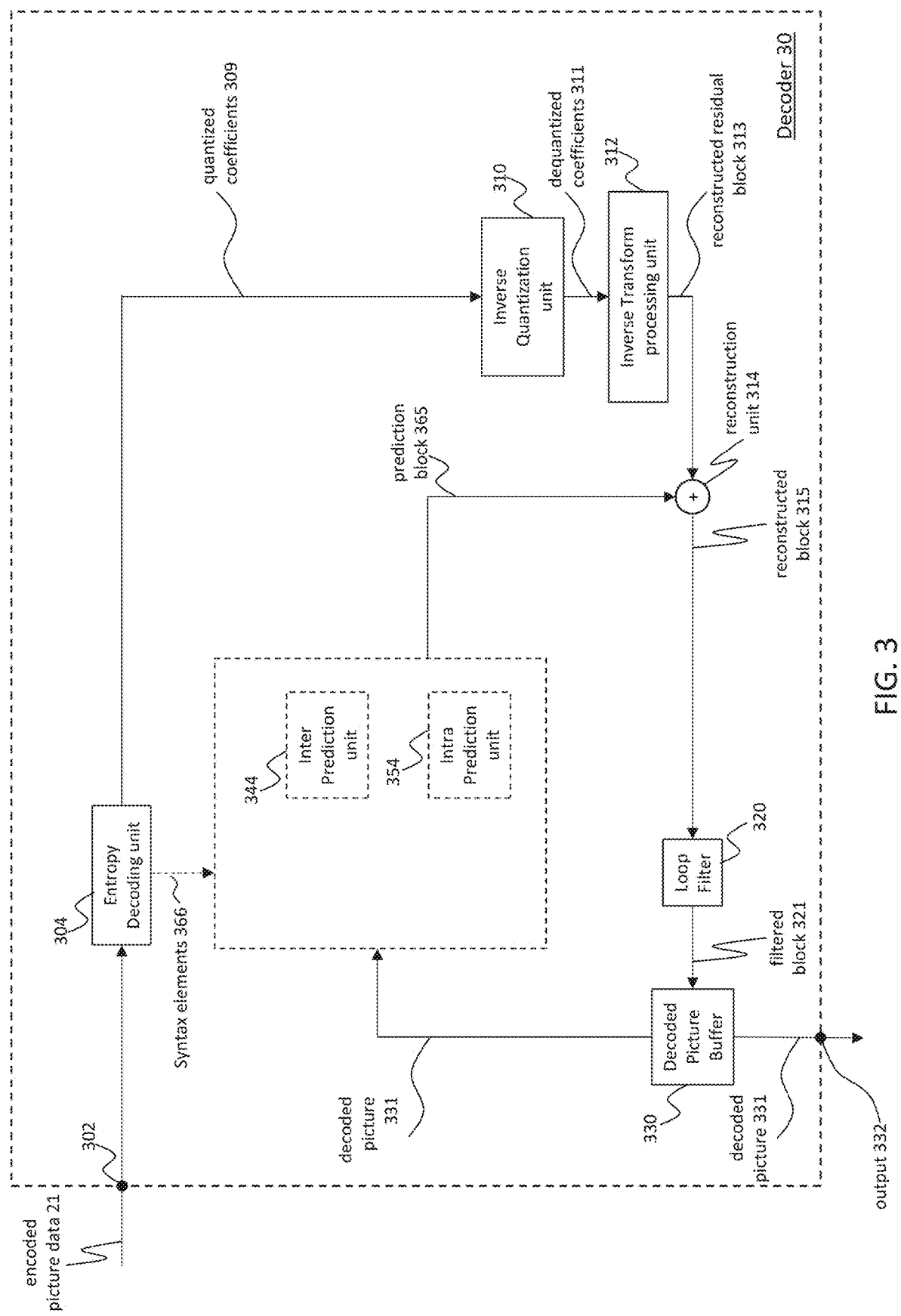
FIG. 3 schematically illustrates an example structure of a video decoder according to an embodiment.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture (or picture data) 17, e.g., picture of a sequence of pictures forming a video or video sequence. The received picture or picture data may also be a pre-processed picture (or pre-processed picture data) 19. For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (or picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In other embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g., the encoding and prediction is performed per block 203.

Residual Calculation

The residual calculation unit 204 may be configured to calculate a residual block 205 (also referred to as residual) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QPs), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (i.e. reconstructed residual block 213) to the prediction block 265 to obtain a reconstructed block 215 in the sample domain, e.g., by adding-sample by sample—the sample values of the reconstructed residual block 213 and the sample values of the prediction block 265.

Filtering

The loop filter unit (or loop filter) 220 is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filter or a collaborative filter, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown) . . . . The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The VTM (Versatile Test Model) version 3.0 uses 93 intra prediction modes, and several intra smoothing tools, including four-tap subpixel intra interpolation filtering and position-dependent prediction combination (PDPC). PDPC is proposed as a unified mechanism of modification of predicted samples that are a results of intra prediction using DC, PLANAR or angular intra prediction modes.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.
Entropy Coding The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.
Decoder and Decoding Method FIG. 3 shows an example of a video decoder according to an embodiment. Video decoder 30 is configured to receive encoded picture data 21 (e.g., encoded bitstream), e.g., encoded by encoder 20, to obtain a decoded picture 331. The encoded picture data or bitstream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer), a loop filter 320, a decoded picture buffer (DBP) 330, an inter prediction unit 344 and an intra prediction unit 354. Inter prediction unit 344 may be or include a motion compensation unit. Video decoder 30 may, in some embodiments, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.
Entropy Decoding The entropy decoding unit 304 is configured to parse the bitstream 21 (or in general encoded picture data) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270) of the encoder 20. Entropy decoding unit 304 may be further configured to provide inter prediction parameters, intra prediction parameter and/or other syntax elements to the mode selection unit 360 and other parameters to other units of the decoder 30. Video decoder 30) may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List ( ) and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, advanced temporal motion vector prediction (ATMVP) modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-$ 1)−1, where "^" means exponentiation. For example, if bitDepth is set equal to 16, the range is −32768~32767: if bitDepth is set equal to 18, the range is −131072~131071.

For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: Remove the Overflow MSB (Most Significant Bit) by Flowing Operations $$ux=(mvx+2^{bitDepth})\% \ 2^{bitDepth} \quad (1)$$

$$mvx=(ux>=2^{bitDepth-1})?(ux-2^{bitDepth}):ux \quad (2)$$

$$uy=(mvy+2^{bitDepth})\% \ 2^{bitDepth} \quad (3)$$

$$mvy=(uy>=2^{bitDepth-1})?(uy-2^{bitDepth}):uy \quad (4)$$

where mvx is a horizontal component of a motion vector of an image block or a sub-block, mvy is a vertical component of a motion vector of an image block or a sub-block, and ux and uy indicates an intermediate value:

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\% \ 2^{bitDepth} \quad (5)$$

$$mvx=(ux>=2^{bitDepth-1})?(ux-2^{bitDepth}):ux \quad (6)$$

$$uy=(mvpy+mvdy+2^{bitDepth})\% \ 2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: Remove the Overflow MSB by Clipping the Value $$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

where vx is a horizontal component of a motion vector of an image block or a sub-block, vy is a vertical component of a motion vector of an image block or a sub-block: x, y and z correspond to three input values of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
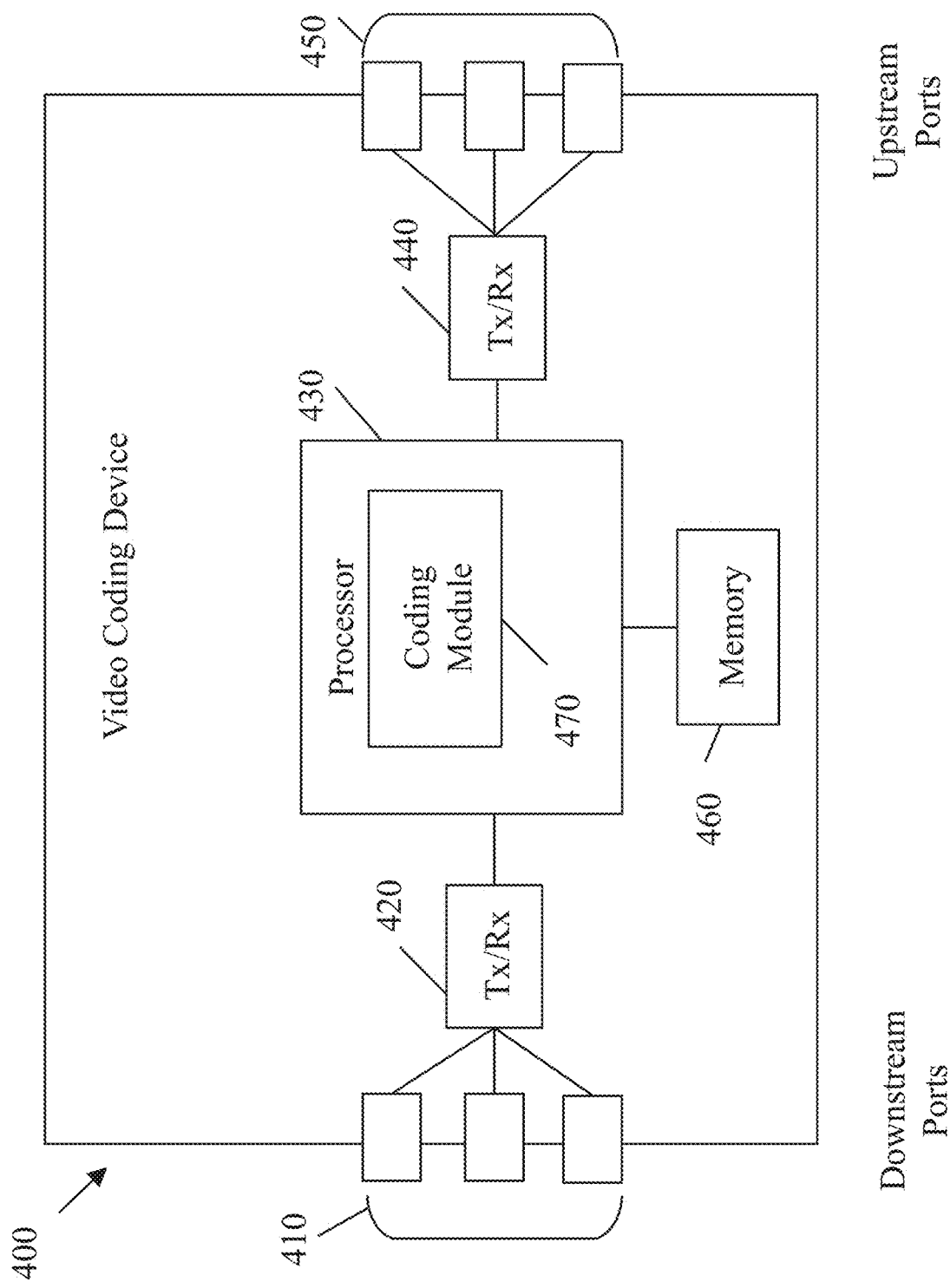
FIG. 4 schematically illustrates an example of an encoding apparatus or a decoding apparatus.

FIG. 4 is a schematic diagram of a video coding device according to an embodiment. Video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports (or input ports) 410 and receiver units (Rx) 420 for receiving data: a processor, logic unit, or central processing unit (CPU) 430 to process the data: transmitter units (Tx) 440 and egress ports (or output ports) 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
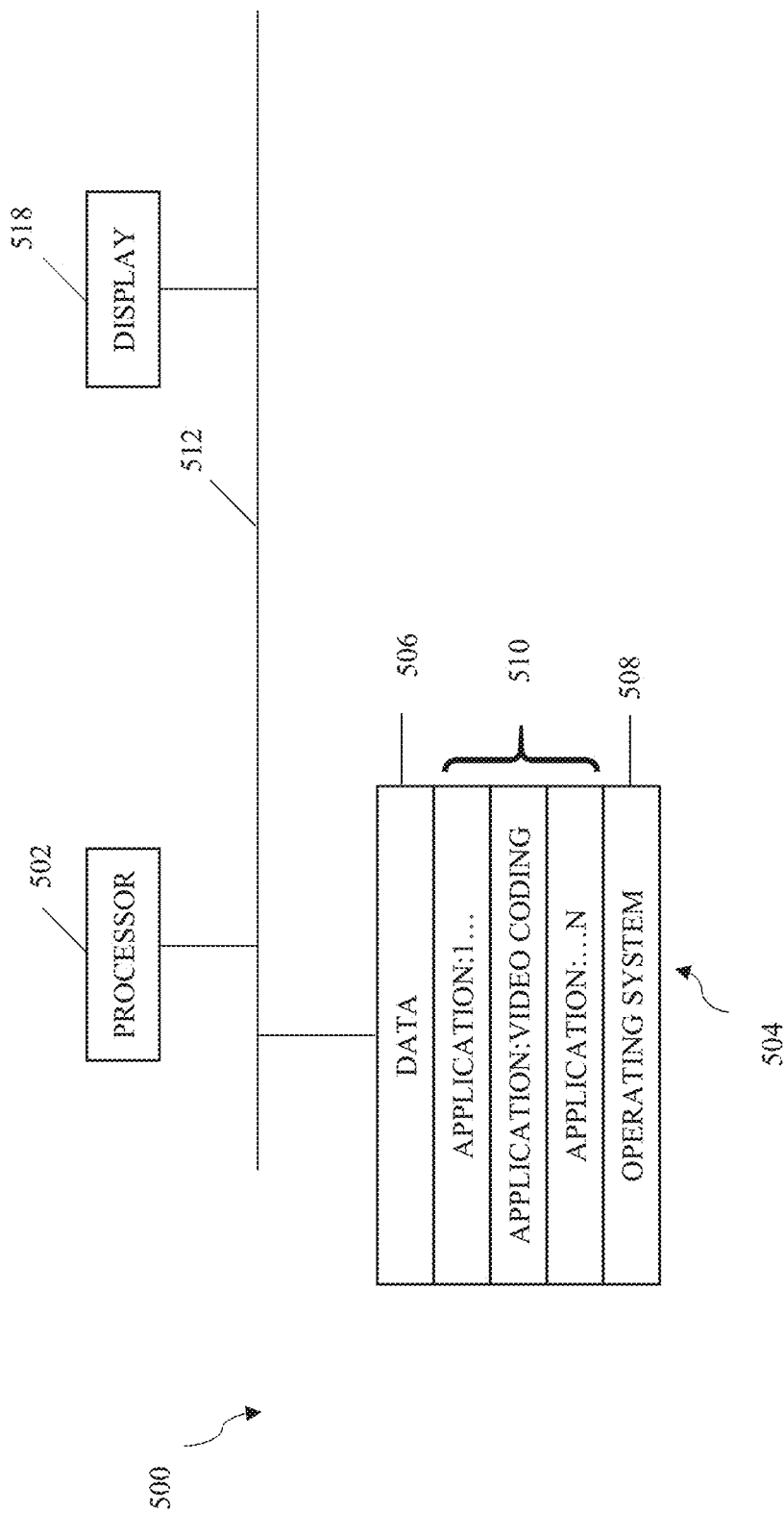
FIG. 5 schematically illustrates another example of an encoding apparatus or a decoding apparatus.
Figure 6:
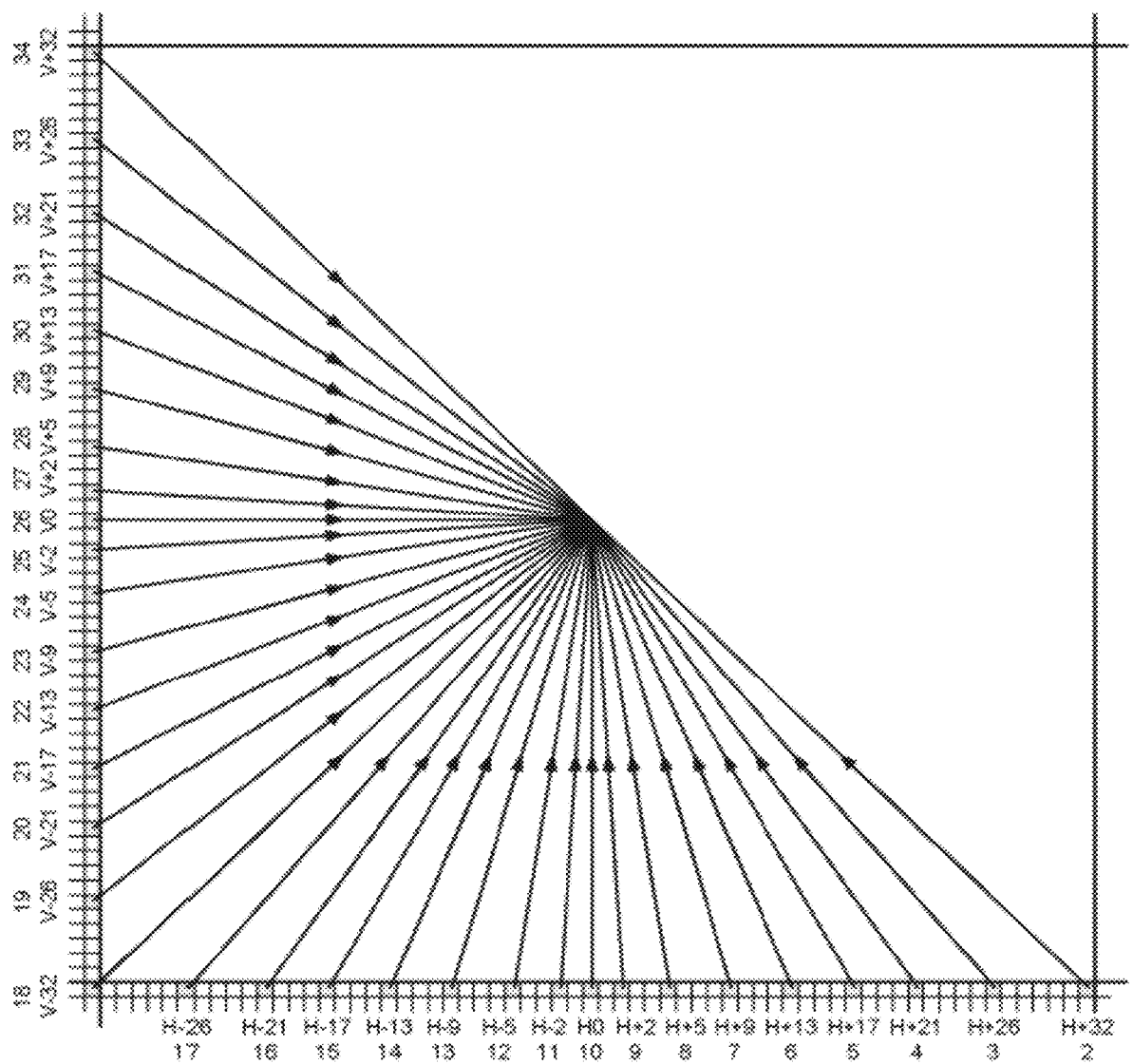
FIG. 6 schematically illustrates angular intra prediction directions and associated intra-prediction modes in HEVC.

FIG. 5 is a simplified block diagram of an apparatus according to an embodiment. Apparatus 500 may be used as either or both of the source device 12 and the destination device 14 from FIG. 1A according to an embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Particular implementation of simplified PDPC could be performed differently, depending on the intra prediction mode:

For planar, DC, HOR/VER intra prediction modes (denoted as 0, 1, 18, 50 respectively in FIG. 7 and FIG. 8), the following operations are performed:

The predicted sample P (x,y) located at (x,y) is calculated as follows:

$$P(x,y) = \text{Clip1}Cmp((wL \times R_{-1,y} + wT \times R_{x,-1} - wTL \times R_{-1,-1} + (64 - wL - wT + wTL) \times P(x,y) + 32)) >> 6) \quad (1)$$

where $R_{x,-1}$, $R_{-1,y}$ represent the reference samples located at top and left of the current sample (x,y), and $R_{-1,-1}$ represents the reference sample located in the top-left corner of the current block, the function clip1 Cmp is set as follows:

If cIdx is equal to 0, clip1 Cmp is set equal to Clip1Y.
Otherwise, clip1Cmp is set equal to Clip1C $$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

BitDepth$_Y$ is the bit depth of luma samples.
BitDepth$_C$ is the bit depth of luma samples.
BitDepth$_Y$ and BitDepth$_C$ could be signaled in sequence parameter set (SPS) of a bitstream.

Alternative definitions of Clip1Y(x) and Clip1C(x) are possible. In particular, as described by F. Galpin, P. Bordes, and F. Le Léannec in contribution JVET-C0040 "Adaptive Clipping in JEM2.0", Clip1Cmp(x)=Clip3(min$_C$, max$_C$, x), where min$_C$ is the lower clipping bound used in current slice for component ID C, max$_C$ is the upper clipping bound used in current slice for component ID C, C is a color component (e.g., Y for luma, Cb and Cr for chroma), "x>>y" is an arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

The DC mode weights are calculated as follows:

$$wT = 32 >> ((y << 1) >> \text{shift}),$$

$$wL = 32 >> ((x << 1) >> \text{shift}),$$

$$wTL = -(wL >> 4) - (wT >> 4),$$

where shift=(log$_2$(width)+log$_2$(height)+2)>>2.

Figure 9:
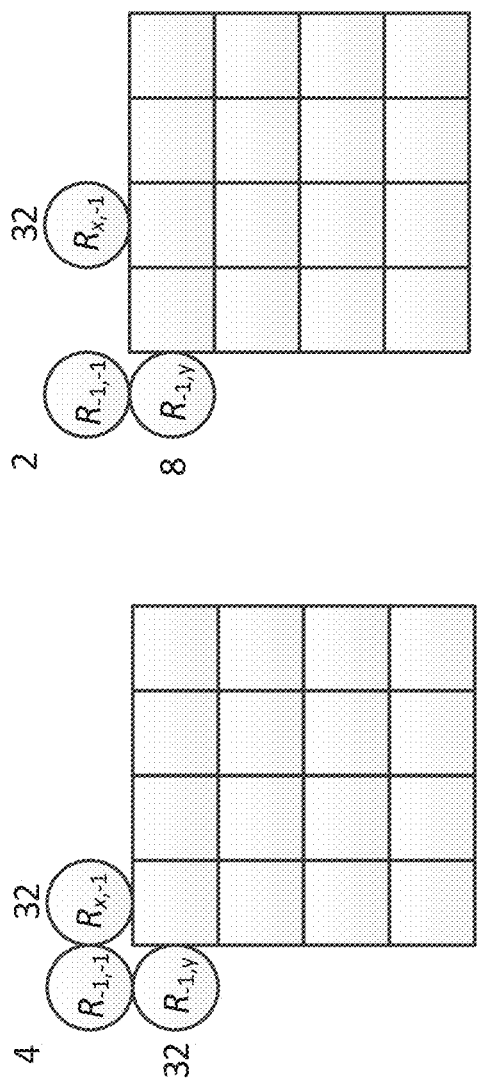
FIG. 9 schematically illustrates angular intra prediction directions and the associated intra-prediction modes in VTM-3.0 and VVC specification draft v.3.

For planar mode, wTL=0, while for the horizontal mode wTL=wT and for vertical mode wTL=wL. DC mode PDPC weights (wL, wT, wTL) for (0, 0) and (1, 0) positions inside one 4×4 block are shown in FIG. 9.

For diagonal (denoted as 2 and 66 in FIG. 7 and FIG. 8) and adjacent modes (directional modes not less than 58 and not greater than 10 in FIG. 7 or FIG. 8) processing is performed as described below using the same formula (1).

Figure 10:
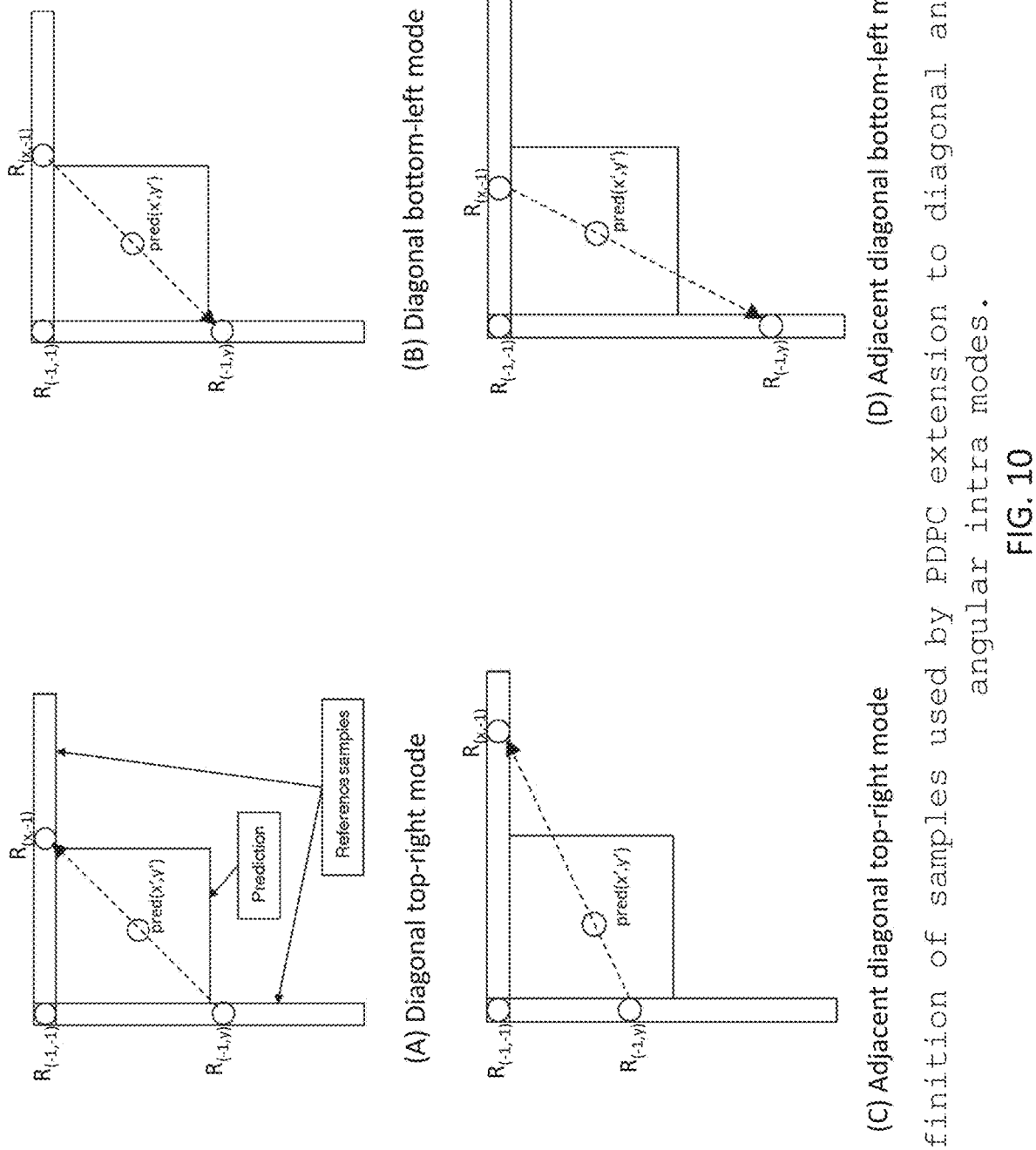
FIG. 10 schematically illustrates an example of DC mode PDPC weights for (0, 0) and (1, 0) positions inside a 4×4 block.

FIG. 10A illustrates the definition of reference samples $R_{x,-1}$, $R_{-1,y}$ and $R_{-1,-1}$ for the extension of PDPC to the top-right diagonal mode. The prediction sample pred(x', y') is located at (x', y') within the prediction block. The coordinate x of the reference sample $R_{x,-1}$ is given by:

$$x = x' + y' + 1,$$

and the coordinate y of the reference sample $R_{-1,y}$ is similarly given by:

$$y = x' + y' + 1.$$

The PDPC weights for the top-right diagonal mode are:

$$wT = 16 >> ((y' << 1) >> \text{shift}),$$

$$wL = 16 >> ((x' << 1) >> \text{shift}),$$

$$wTL = 0.$$

Similarly, FIG. 10B illustrates the definition of reference samples $R_{x,-1}$, $R_{-1,y}$ and $R_{-1,-1}$ for the extension of PDPC to the bottom-left diagonal mode. The coordinate x of the reference sample $R_{x,-1}$ is given by:

$$x = x' + y' + 1,$$

and the coordinate y of the reference sample $R_{-1,y}$ is:

$$y = x' + y' + 1.$$

The PDPC weights for the bottom-left diagonal mode are:

$$wT = 16 >> ((y' << 1) >> \text{shift}),$$

$$WL = 16 >> ((x' << 1) >> \text{shift}),$$

$$wTL = 0.$$

The case of an adjacent top-right diagonal mode is illustrated in FIG. 10C. The PDPC weights for an adjacent top-right diagonal mode are:

$$wT = 32 >> ((y' << 1) >> \text{shift}),$$

$$wL = 0,$$

$$wTL = 0.$$

Similarly, the case of an adjacent bottom-left diagonal mode is illustrated in FIG. 10D. The PDPC weights for an adjacent bottom-left diagonal mode are:

$$wL = 32 >> ((x' << 1) >> \text{shift}),$$

$$wT = 0,$$

$$wTL = 0.$$

The reference sample coordinates for the last two cases are computed using the tables that are already used for angular mode intra prediction. Linear interpolation of the reference samples is used if fractional reference sample coordinates are calculated.

Simplified PDPC could be performed as specified in the VVC specification. Further the following denotation are used:

$$invAngle = \text{Round}\left(\frac{256*32}{intraPredAngle}\right),$$

$$\text{Round}(x)=\text{Sign}(x)*\text{Floor}(\text{Abs}(x)+0.5),$$

$$\text{Sign}(x) = \begin{cases} 1; & x > 0 \\ 0; & x == 0 \\ -1; & x < 0 \end{cases}$$

Floor (x) is the largest integer less than or equal to x,
Log 2(x) is the base-2 logarithm of x.
intraPredAngle is the angle parameter specified in Table 6,
A=C?B:D is a ternary assignment operation, where A is set equal to B if condition C is true. Otherwise, if condition C is false, A is set equal to D.
INTRA_PLANAR is a planar intra prediction mode ( ),
INTRA_DC is a DC intra prediction mode,
INTRA_ANGULARXX is a one of directional intra prediction modes, where XX denotes its number and corresponding direction shown in FIG. 8.

If a term is not explained herein, it is understood that its definition can be found in the VVC specification or HEVC/H.265 standard specification.

Given the denotations above, the operations of simplified PDPC can be defined as follows:
Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighboring samples p[x][y], with
x=−1, y=−1 . . . refH−1 and x=0 . . . refW−1, y=−1,
a variable cIdx specifying the color component of the current block.

Outputs of this process are the modified predicted samples predSamples[x][y] with x=0 . . . nTbW−1, y=0 . . . nTbH−1.
Depending on the value of cIdx, the function clip1Cmp is set as follows:
If cIdx is equal to 0, clip1Cmp is set equal to $\text{Clip1}_Y$.
Otherwise, clip1Cmp is set equal to $\text{Clip1}_C$.
The variable nScale is set to ((Log 2 (nTbW)+Log 2 (nTbH)−2)>>2).
The reference sample arrays mainRef[x] and sideRef[y], with x=0 . . . refW−1 and y=0 . . . refH−1 are derived as follows:

mainRef[x]=p[x][−1]

sideRef[y]=p[−1][y]

The variables refL[x][y], refT[x][y], wT[y], wL[x] and wTL[x][y] with X=0 . . . nTbW−1, y=0 . . . nTbH−1 are derived as follows:

If predModeIntra is equal to INTRA_PLANAR, INTRA_DC, INTRA_ANGULAR18, or INTRA_ANGULAR50, the following applies:

refL[x][y]=p[−1][y]

refT[x][y]=p[x][−1]

wT[y]=32>>((y<<1)>>nScale)

wL[x]=32>>((x<<1)>>nScale)

wTL[x][y]=(predModeIntra==INTRA_DC)?((wL[x]>>4)+(wT[y]>>4)):0

Otherwise, if predModeIntra is equal to INTRA_ANGULAR2 or INTRA_ANGULAR66, the following applies:

refL[x][y]=p[−1][x+y+1]

refT[x][y]=p[x+y+1][−1]

wT[y]=(32>>1)>>((y<<1)>>nScale)

wL[x]=(32>>1)>>((x<<1)>>nScale)

wTL[x][y]=0

Otherwise, if predModeIntra is less than or equal to INTRA_ANGULAR10, the following ordered operations apply:
1. The variables dXPos[y], dXFrac[y], dXInt[y] and dX[x][y] are derived as follows using invAngle:

dXPos[y]=((y+1)*invAngle+2)>>2 dXFrac[y]=dXPos[y]&63 dX Int[y]=dXPos[y]>>6 dX[x][y]=x+dX Int[y]

2. The variables refL[x][y], refT[x][y], wT[y], wL[x] and wTL[x][y] are derived as follows:

refL[x][y]=0 refT[x][y]=(dX[x][y]<refW−1)?((64−dXFrac[y])*mainRef[dX[x][y]]+dXFrac[y]*mainRef[dX[x][y]+1]+32)>>6:0 (Eq.1)

wT[y]=(dX[x][y]<refW−1)?32>>((y<<1)>>nScale):0 wL[x]=0 wTL[x][y]=0

Otherwise, if predModeIntra is greater than or equal to INTRA_ANGULAR58 (see FIG. 8), the following ordered operations apply:
1. The variables dYPos[x], dYFrac[x], dYInt[x] and dY[x][y] are derived as follows using invAngle as specified in below depending on intraPredMode:

dYPos[x]=((x+1)*invAngle+2)>>2 dYFrac[x]=dYPos[x]&63 dY Int[x]=dYPos[x]>>6 dY[x][y]=y+dY Int[x]

2. The variables refL[x][y], refT[x][y], wT[y], wL[x] and wTL[x][y] are derived as follows:

refL[x][y]=(dY[x][y]<refH−1)?((64−dYFrac[x])*sideRef[dY[x][y]]+dYFrac[x]*sideRef[dY[x][y]+1]+32)>>6:0 (Eq. 2)

refT[x][y]=0 wT[y]=0 wL[x]=(dY[x][y]<refH-1)?32>>((x<<1)>>nScale):0 wTL[x][y]=0

Otherwise, refL[x][y], refT[x][y], wT[y], wL[x] and wTL[x][y] are all set equal to 0.

The values of the modified predicted samples predSamples[x][y], with x=0 . . . nTbW-1, y=0 . . . nTbH-1 are derived as follows:

predSamples[x][y]=clip1Cmp((refL[x][y]*wL[x]+refT[x][y]*wT[y]-p[-1][-1]*wTL[x][y]+(64-wL[x]-wT[y]+wTL[x][y])*predSamples[x][y]+32)>>6)

In assignment Eq. 1 above simplified PDPC may use nearest-neighbor interpolation instead of linear one:

refT[x][y]=(dX[x][y]<refW-1)?mainRef[dX[x][y]]:0

Similarly, assignment Eq. 2 could also use nearest-neighbor interpolation:

refL[x][y]=(dY[x][y]<refH-1)?sideRef[dY[x][y]]:0

Figure 7:
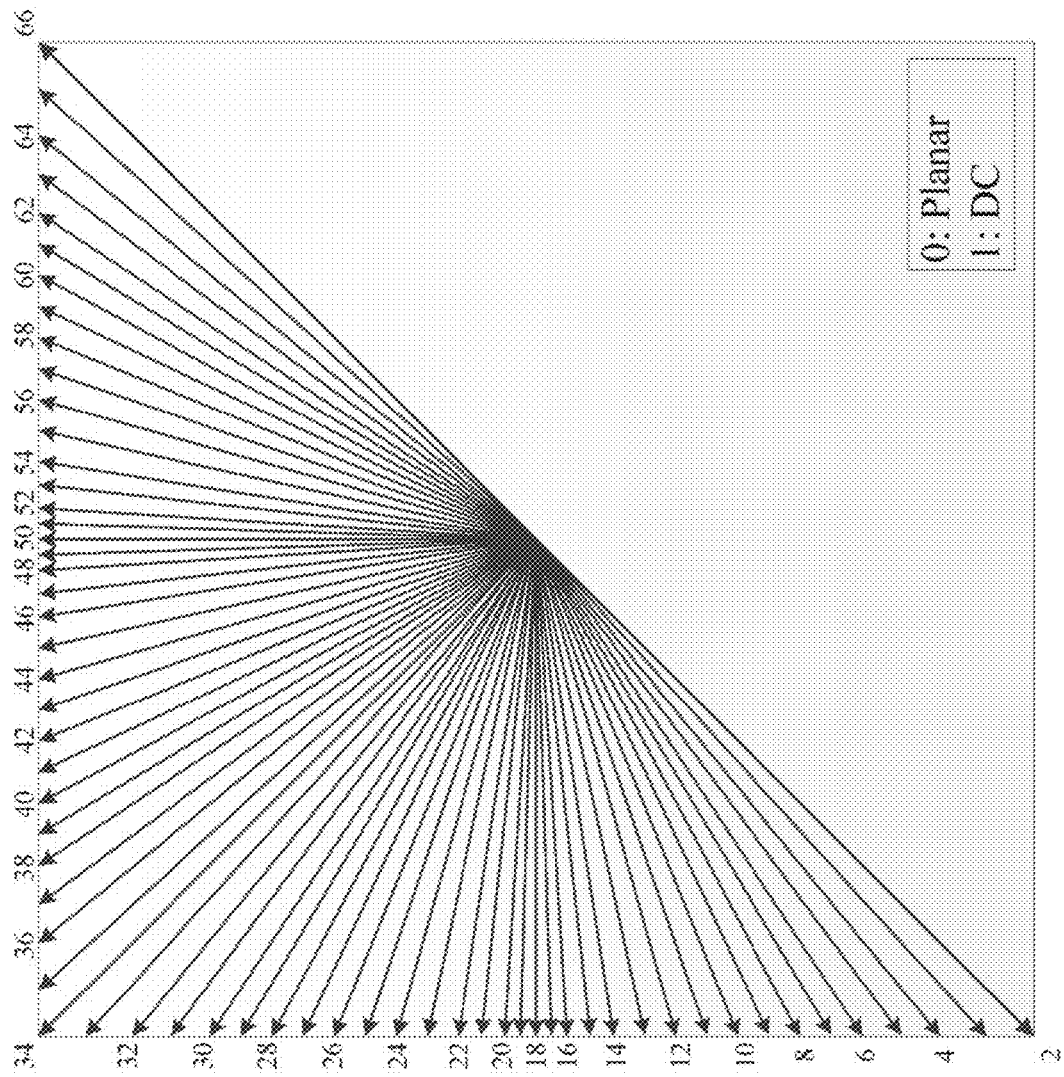
FIG. 7 schematically illustrates angular intra prediction directions and associated intra-prediction modes in JEM.
Figure 8:
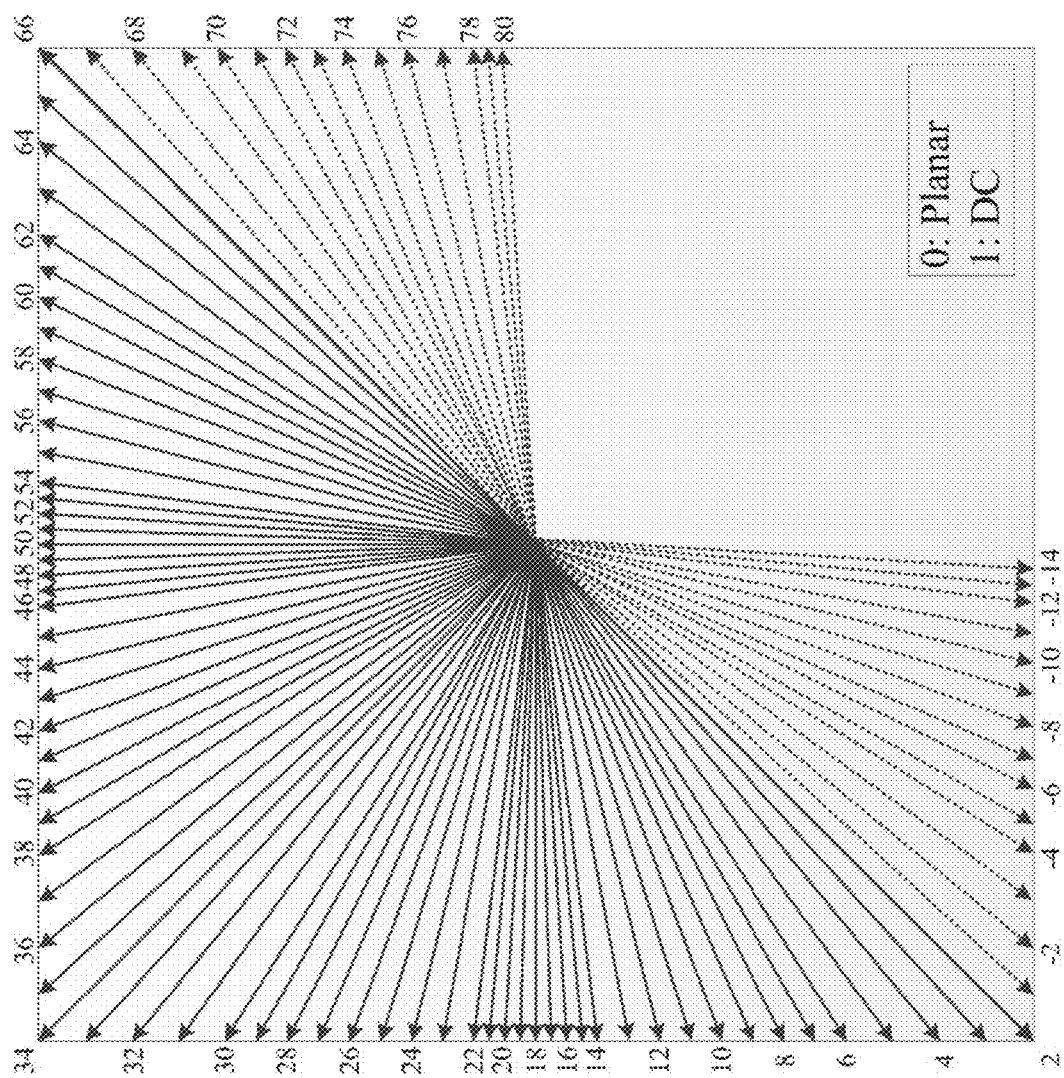
FIG. 8 schematically illustrates angular intra prediction directions and associated intra-prediction modes in VTM-3.0 and VVC specification draft v.3.

Thus, at both encoder and decoder sides, proposed method uses the following as the input data:
  directional intra prediction mode (denoted further as predModeIntra, which is shown in FIG. 7 and FIG. 8)
  block size parameter nTbS, which is set equal to (log 2(nTbW)+Log 2 (nTbH))>>1, where nTbW and nTbH denote width and height of the predicted block, respectively, and ">>" denotes a right-shift operation.

The modification of the VVC specification that enables usage of the proposed method may comprise substituting "the neighboring samples p[x][y]" by "the reference samples p[x][y]" in the section describing simplified PDPC.

The angle parameter intraPredAngle denotes the subpixel offset between two adjacent rows of predicted samples in fixed point representation having length of fractional part equal to 5-bits. This parameter could be derived from the intra prediction mode is derived from predModeIntra and. An exemplary derivation of intraPredAngle from predModeIntra could be defined with a LUT, e.g., as it is shown in Table 1.

TABLE 1

| An exemplary LUT to derive intraPredAngle from predModeIntra. | | | | | | | |
|---|---|---|---|---|---|---|---|
| Wide angle modes for NxM blocks, M > N | | | | | | | |
| predModeIntra | -14 | -13 | -12 | -11 | -10 | -9 | -8 | -7 |
| intraPredAngle | 512 | 341 | 256 | 171 | 128 | 102 | 86 | 73 |
| Modes in the range of [2; HOR_IDX) | | | | | | | | |
| predModeIntra | 2 | 3 | 4 | 5 | 6 | 7 | 8 | 9 | 10 |
| intraPredAngle | 32 | 29 | 26 | 23 | 20 | 18 | 16 | 14 | 12 |
| Modes in the range of [HOR_IDX; DIA_IDX) | | | | | | | | | |
| predModeIntra | 18 | 19 | 20 | 21 | 22 | 23 | 24 | 25 | 26 |
| intraPredAngle | 0 | -1 | -2 | -3 | -4 | -6 | -8 | -10 | -12 |
| Modes in the range of [DIA_IDX; VER_IDX) | | | | | | | | | |
| predModeIntra | 34 | 35 | 36 | 37 | 38 | 39 | 40 | 41 | 42 |
| intraPredAngle | -32 | -29 | -26 | -23 | -20 | -18 | -16 | -14 | -12 |
| Modes in the range of [VER_IDX; VDIA_IDX] | | | | | | | | | |
| predModeIntra | 50 | 51 | 52 | 53 | 54 | 55 | 56 | 57 | 58 | 59 |
| intraPredAngle | 0 | 1 | 2 | 3 | 4 | 6 | 8 | 10 | 12 | 14 |
| Wide angle modes for NxM blocks, M < N | | | | | | | | | | |
| predModeIntra | 67 | 68 | 69 | 70 | 71 | 72 | 73 | 74 |
| intraPredAngle | 35 | 39 | 45 | 51 | 57 | 64 | 73 | 86 |
| Wide angle modes for NxM blocks, M > N | | | | | | | |
| predModeIntra | -6 | -5 | -4 | -3 | -2 | -1 |
| intraPredAngle | 64 | 57 | 51 | 45 | 39 | 35 |
| Modes in the range of [2; HOR_IDX) | | | | | | | |
| predModeIntra | 11 | 12 | 13 | 14 | 15 | 16 | 17 |
| intraPredAngle | 10 | 8 | 6 | 4 | 3 | 2 | 1 |
| Modes in the range of [HOR_IDX; DIA_IDX) | | | | | | | |
| predModeIntra | 27 | 28 | 29 | 30 | 31 | 32 | 33 |
| intraPredAngle | -14 | -16 | -18 | -20 | -23 | -26 | -29 |
| Modes in the range of [DIA_IDX; VER_IDX) | | | | | | | |
| predModeIntra | 43 | 44 | 45 | 46 | 47 | 48 | 49 |
| intraPredAngle | -10 | -8 | -6 | -4 | -3 | -2 | -1 |
| Modes in the range of [VER_IDX; VDIA_IDX] | | | | | | | |
| predModeIntra | 60 | 61 | 62 | 63 | 64 | 65 | 66 |
| intraPredAngle | 16 | 18 | 20 | 23 | 26 | 29 | 32 |
| Wide angle modes for NxM blocks, M < N | | | | | | | |
| predModeIntra | 75 | 76 | 77 | 78 | 79 | 80 |
| intraPredAngle | 102 | 128 | 171 | 256 | 341 | 512 |

Figure 11:
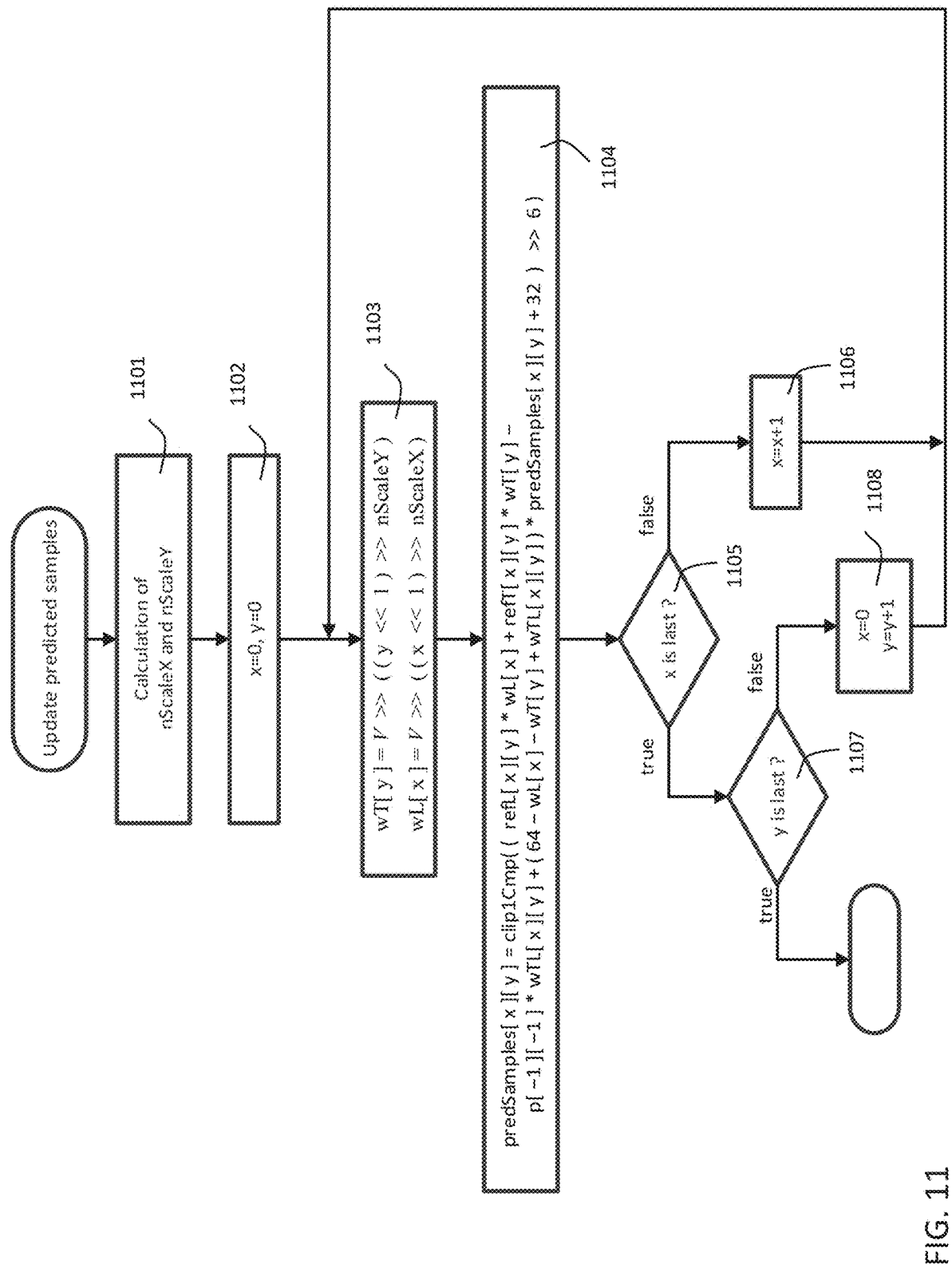
FIG. 11 schematically illustrates an example of intra-predicting a block from reference samples of the main reference side.
Figure 13:
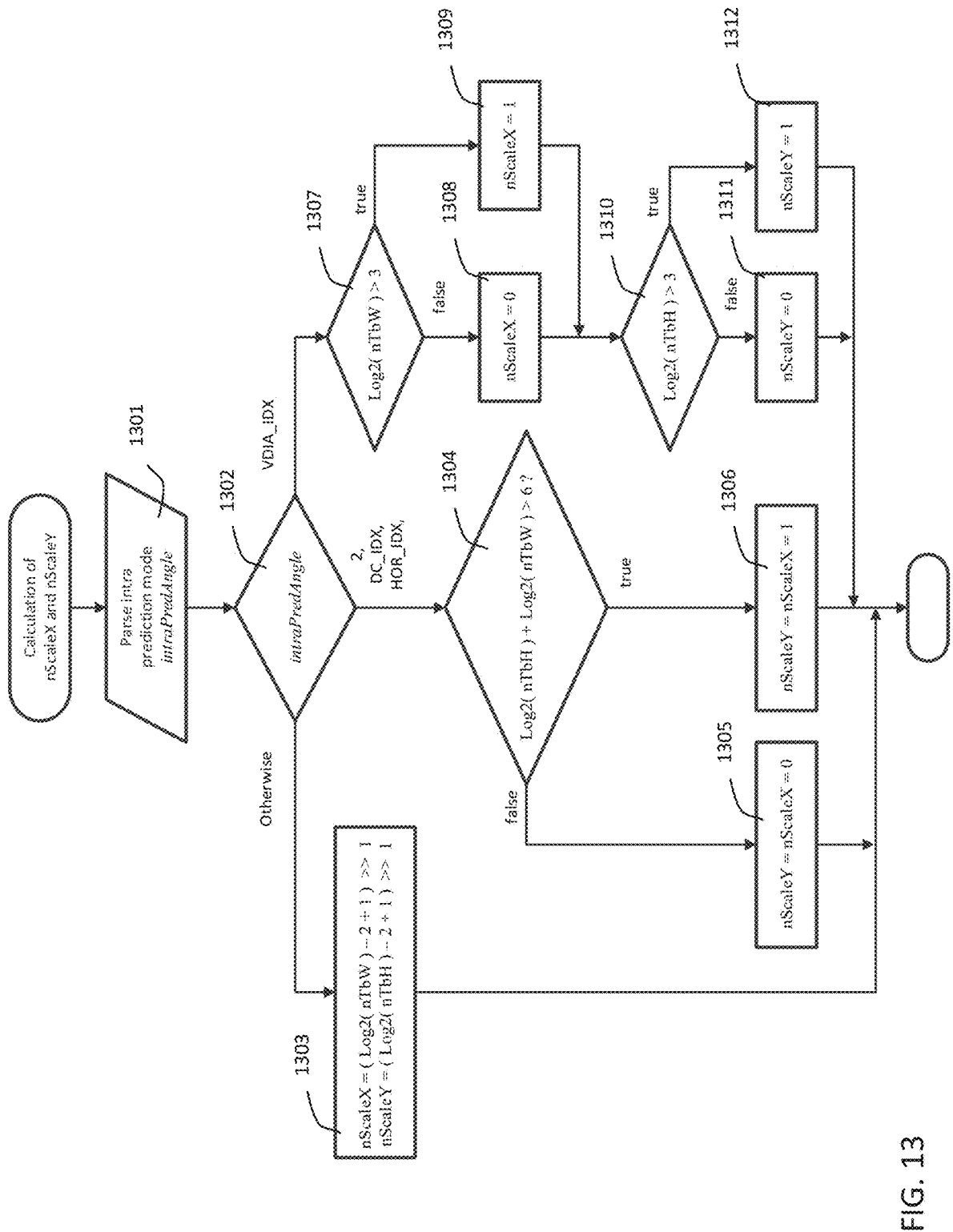
FIG. 13 schematically illustrates an example of a method of determining a vertical and a horizontal scaling factor.

In this application, it is proposed to update predicted samples that were obtained from the reference samples using directional, planar or DC intra prediction modes. The operations of the update procedure are shown in FIG. 11. The first operation 1101 is to calculate scale values nScaleX and nScaleY depending on the block shape and size. An implementation form of this calculation is described further in FIG. 13.

Operations 1103 and 1104 are performed within a loop over all predicted samples positions. Initialization of the loop iterators x and y is performed in operation 1102, iterators' boundary checks are performed by operations 1105 and 1107, iterator increments are performed in operations 1106 and 1108. Operation 1108 resets iterators x and y to the start of the next row, i.e. x is set equal to zero and row iterator y is incremented by 1.

Operation 1103 consists in calculating the position-dependent weight values wL[x] and wT[y]. These weight values are obtained by right-shifting the base value V. The value V is connected with the right shift operation of step 4. If this right-shift is set to s, the practical value of V could be defined, e.g., as $2^s$, $2^{s-1}$ or $2^s$. In the exemplary embodiment shown in FIG. 11 the value of s is set equal to 6, and the value of V is set equal to 32, i.e. $2^5$.

In contrast to the state-of-the-art methods, wL[x] and wT[y] in operation 1103 uses different values of scales nScaleX and nScaleY, respectively. These weight values wL[x] and wT[y] are further used in operation 1104 to calculate the modified value of predicted samples.

Figure 12:
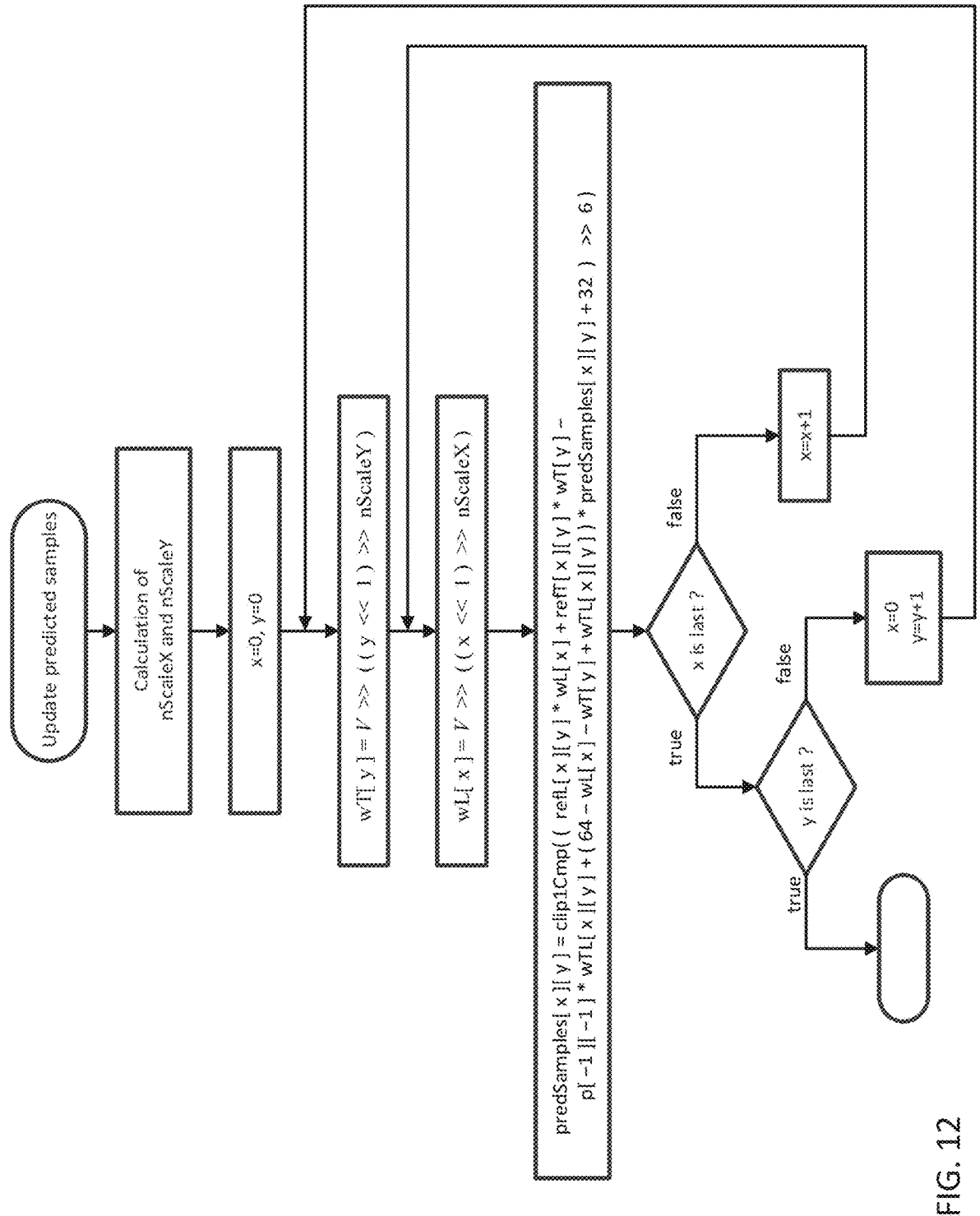
FIG. 12 illustrates an example of DC mode PDPC weights for (0, 0) and (1, 0) positions inside a 4×4 block.

Alternative embodiment of predicted samples update is given in FIG. 12. In this embodiment weight wT[y] is recalculated only once per row, i.e. when iterator y is incremented.

Due to the QTBT and MTT partitioning, prediction blocks may be non-square (generally, rectangular) shape. However, state-of-the-art PDPC does not consider potential non-equality of width and height of a prediction block. Weighting mechanism based just on a value of distance to the left and top sides of predicted block may lead to predicted samples being too smooth if predicted block aspect ratio is different from 1. In the present disclosure, it is proposed to balance the effect of the block size and block aspect ratio using intra-prediction mode. Using directionality information provided by intra-prediction mode it is possible to determine the propagation distance and directionality of the PDPC smoothing effect. Hence it is proposed to introduce a group of intra prediction mode and to apply dedicated weight scaling adaptation for each of the group. In this case even oblong prediction blocks will use smoothing in accordance with the length of the side where it is appropriate according to the intra prediction mode and prediction block dimensions.

Herein, it is suggested to use separate nScale values when deriving weights wT[y] and wL[x]. Particularly, in the description above (operation 1103) the following formulas will be used (value of V is set accordingly to either 16 or 32):

$$wT[y]=V>>((y<<1)>>nScaleY)$$

$$wL[x]=V>>((x<<1)>>nScaleX)$$

Figure 14:
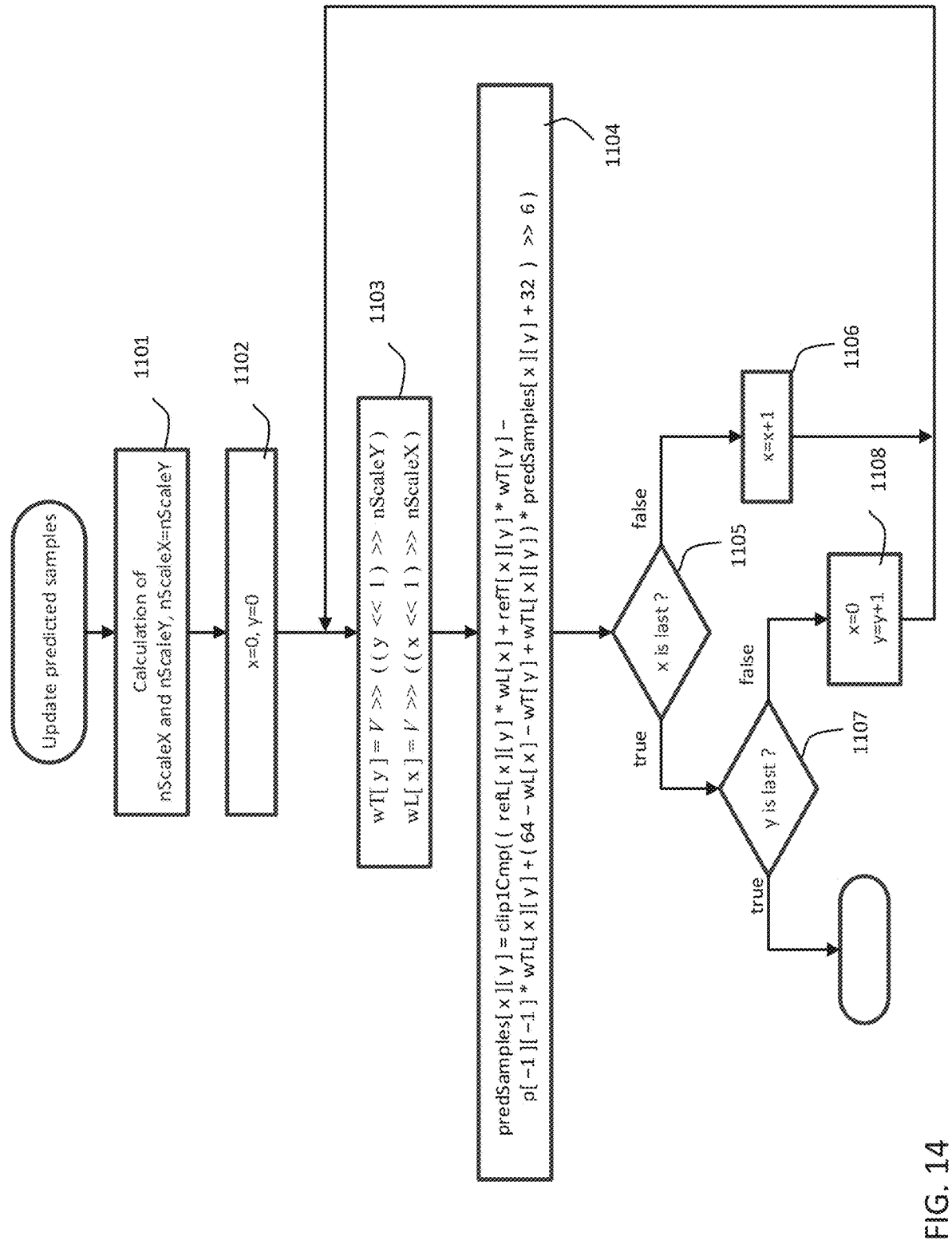
FIG. 14 schematically illustrates an example of a method of determining a vertical and a horizontal scaling factor.

Calculation of scales (operation 1101) could be performed as it is shown in FIG. 14. This is an alternative calculation in comparison to the one shown in FIG. 12. The first operation 1301 is to get the value of the intra prediction mode intraPredAngle of the predicted block, e.g., by parsing from the bitstream. The next operation 1302 consists in classifying the intra prediction mode onto one of the groups.

The further definition of skew non-diagonal intra prediction mode is used further: intraPredMode is skew non-diagonal if intraPredMode is not equal to 2 or VDIA_IDX and one of the following is true: intraPredMode is not less than VDIA_IDX−numModes or intraPredMode is not greater than 2+numModes.

Exemplary classification is given in Table 2.

TABLE 2

Class index derivation based on intra prediction mode.

| Group of intra prediction modes | 2, DC_IDX, HOR_IDX | VDIA_IDX | Other modes |
|---|---|---|---|
| Class index | 1 | 2 | 0 |

Depending on the mode class index, the derivation of nScaleX and nScaleY could be different. Operations 1303, . . . , 1312 represent the mapping of the class index to the derivation formulas shown in Table 3.

TABLE 3

Mapping of the class index to the derivation method of nScaleX and nScaleY.

| Class index | Derivation method |
|---|---|
| 0 | nScaleX = (Log2(nTbW) − 2 + 1) >> 1<br>nScaleY = (Log2(nTbH) − 2 + 1) >> 1 |
| 1 | nScaleY = nScaleX = (Log2(nTbH) + Log2(nTbW)) > 6 ? 1: 0 |
| 2 | nScaleX = Log2(nTbW) > 3 ? 1: 0<br>nScaleY = Log2(nTbH) > 3 ? 1: 0 |

Alternative classifications are given in Tables 4, 5 and 6.

TABLE 4

Alternative class index derivation based on intra prediction mode.

| Group of intra prediction modes | DC_IDX, HOR_IDX, VER_IDX | 2, VDIA_IDX | Other modes |
|---|---|---|---|
| Class index | 1 | 2 | 0 |

TABLE 5

Alternative class index derivation based on intra prediction mode.

| Group of intra prediction modes | DC_IDX, HOR_IDX, VER_IDX | 2, VDIA_IDX | Other modes |
|---|---|---|---|
| Class index | 2 | 1 | 0 |

TABLE 6

Alternative class index derivation based on intra prediction mode.

| Group of intra prediction modes | DC_IDX, HOR_IDX, VER_IDX | Diagonal modes with integer subpixel step: −14 −12 −10 −6, 2, VDIA_IDX, 72, 76, 78, 80 | Other modes |
|---|---|---|---|
| Class index | 2 | 1 | 0 |

In Table 6, Class 1 is specified for not only diagonal modes, but for wide-angle modes that has non-fractional IntraPredAngle value (i.e. a multiple of 32 in Table 1).

Additional constraint that could be implied to this application is not to apply predicted sample update operations in case of the certain combinations of conditions on block size and intra prediction mode (intraPredMode).

Presuming a pre-defined parameter numModes equal to 8, particular implementation may comprise the following condition of disabling PDPC, i.e. not performing predicted sample update:

a sum of width of the block and a height of the block is greater than 64 samples and either intraPredMode is skew non-diagonal or it is equal to PLANAR_IDX.

Embodiments of the invention may demonstrate improvement of compression performance. Modifications to the VTM-3.0 software described by Table 4 and Table 3 results in the following compression performance improvement (Table 7).

TABLE 7

Compression performance improvement achieved by modifications to the VTM-3.0 software All Intra Main10 Over VTM-3.0

|  | Y | U | V | EncT | DecT |
|---|---|---|---|---|---|
| Class A1 | −0.02% | −0.13% | 0.04% | 100% | 100% |
| Class A2 | −0.08% | −0.04% | −0.05% | 99% | 100% |
| Class B | −0.04% | −0.06% | −0.06% | 99% | 99% |

TABLE 7-continued

Compression performance improvement achieved by modifications to the VTM-3.0 software

|  | Y | U | V | EncT | DecT |
|---|---|---|---|---|---|
| Class C | −0.05% | −0.03% | −0.23% | 99% | 99% |
| Class E | −0.05% | 0.01% | −0.08% | 99% | 100% |
| Overall | −0.05% | −0.05% | −0.08% | 99% | 99% |
| Class D | −0.03% | −0.16% | 0.00% | 99% | 99% |
| Class F | −0.02% | −0.06% | −0.04% | 100% | 100% |

Random Access Main 10 Over VTM-3.0

|  | Y | U | V | EncT | DecT |
|---|---|---|---|---|---|
| Class A1 | 0.01% | −0.01% | 0.08% | 100% | 99% |
| Class A2 | −0.06% | 0.02% | 0.19% | 99% | 99% |
| Class B | −0.03% | 0.09% | 0.03% | 100% | 99% |
| Class C | −0.02% | −0.14% | 0.18% | 99% | 100% |
| Class E |  |  |  |  |  |
| Overall | −0.03% | −0.01% | 0.11% | 100% | 99% |
| Class D | −0.04% | −0.40% | −0.07% | 99% | 100% |
| Class F | −0.03% | −0.13% | 0.04% | 99% | 99% |

In another embodiments, the value of nScale is set dependent on the value of the inverse angle that is derived from the intra prediction mode. According to the embodiment, the following operations are performed to obtain the value of nScale factor in accordance with the value of intra prediction mode (predModeIntra):

derive the value of intraPredAngle parameter based on the predModeIntra prediction mode value;

derive the value of inverse angle (invAngle) on the basis of intraPredAngle parameter; and obtain the value of nScale factor based on the size of the block and on the invAngle value.

Derivation of the value of intraPredAngle parameter based on the predModeIntra prediction mode value could be implemented as fetching from a lookup-table. An exemplary lookup table is given in Table 8.

TABLE 8

An exemplary lookup table for intraPredAngle parameter

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 |  |  |  |  |  |  |  |  |  |
| intraPredAngle | 73 | 86 | 102 | 128 | 171 | 256 | 341 | 512 |  |  |  |  |  |  |  |  |  |

The inverse angle parameter inv Angle is derived based on intraPredAngle as follows:

$$invAngle = \text{Round}\left(\frac{512*32}{intraPredAngle}\right)$$

Table 9 and Table 10 are used to specify the nScale value based on predModeIntra and invAngle values.

TABLE 9

Mapping of the class index to the derivation method of nScaleX and nScaleY.

| Class index | Derivation method |
|---|---|
| 0 | nScaleY = nScaleX = (Log2(nTbH) + Log2(nTbW) − 2) >> 2 |
| 1 | nScaleY = nScaleX = Min(2, Log2(nTbH) − Floor(Log2(3*invAngle − 2)) + 8) |
| 2 | nScaleY = nScaleX = Min(2, Log2(nTbW) − Floor(Log2(3*invAngle − 2)) + 8) |

TABLE 10

Class index derivation based on intra prediction mode.

| Group of intra prediction modes | predModeIntra > 50 | predModeIntra < 18 && predModeIntra! = 0 && predModeIntra! = 1 | Other modes |
|---|---|---|---|
| Class index | 1 | 2 | 0 |

Figure 15:
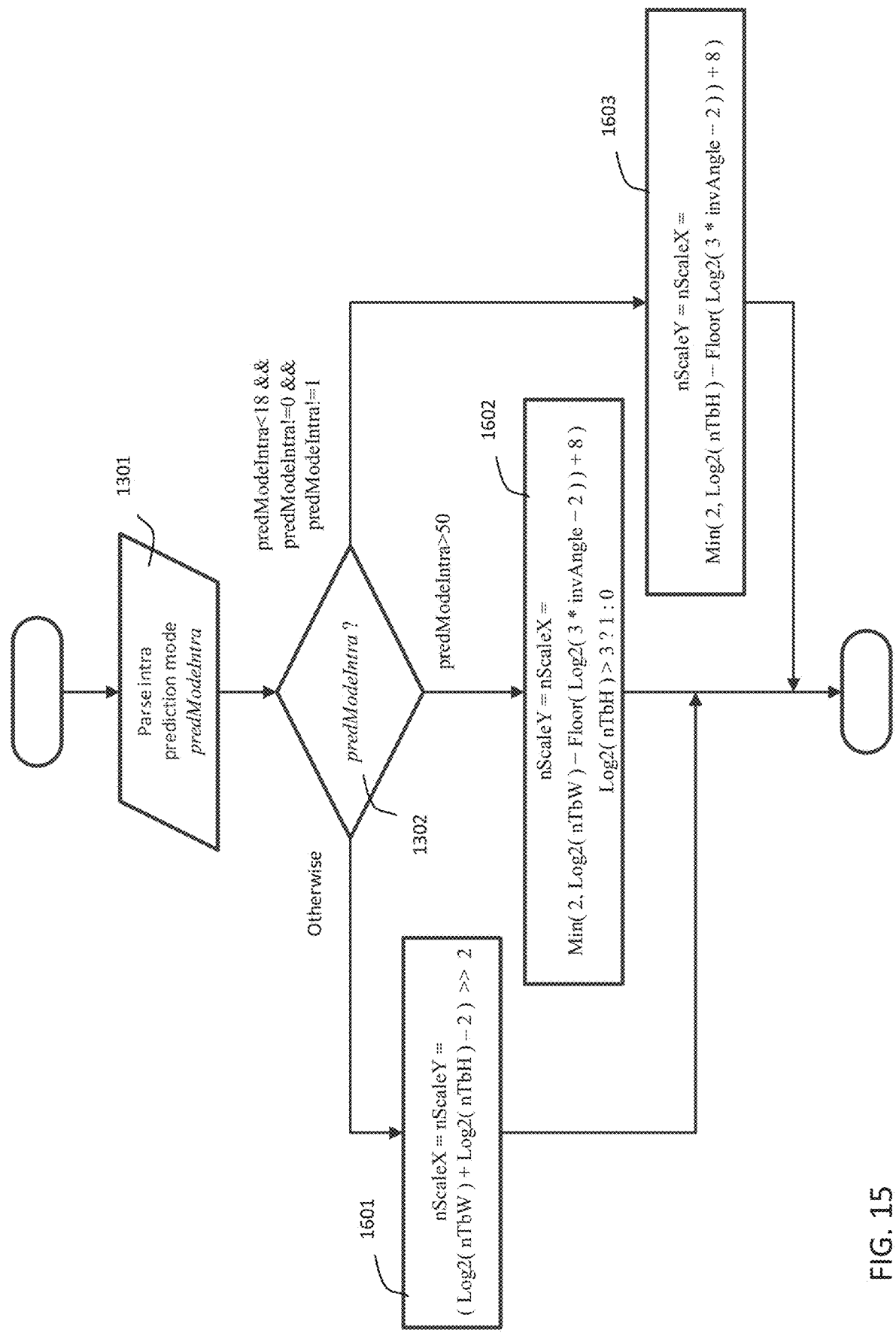
FIG. 15 schematically illustrates an alternative example of a method of determining a vertical and a horizontal scaling factor.

FIG. 15 shows the operations of the application in accordance with the classification given in Table 9 and Table 10. The variable denoted in FIG. 13 as "IntraPredAngle" is denoted in FIG. 15 as "predModeIntra". This variable indicates an intra prediction mode that was is to obtain predicted sample values that are input to PDPC filtering process. Correspondence between values of predModeIntra and intra prediction directions is shown in FIG. 8.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure comprises the following further aspects.

A first aspect of a method of intra predicting a block of a picture, comprising for each sample from a plurality of samples of the block:
 determining a predicted sample value from one or more reference sample values by intra-prediction using one of a DC intra-predication mode, a PLANAR intra predication mode, and an angular intra-prediction mode:
 multiplying the predicted sample value by a sample weighting factor, resulting in a weighted predicted sample value:
 determining a vertical scaling factor (nScaleY) based on the height of the block and the intra prediction mode:
 determining a horizontal scaling factor (nScaleX) based on the width of the block and the intra prediction mode:
 determining a first weight based on the vertical scaling factor (nScaleY):
 determining a second weight based on the horizontal scaling factor (nScaleX):
 calculating an additional value as a weighted sum of a top reference sample value and a left reference sample value by weighting the top reference sample value with the first weight and the left reference sample value with the second weight:
 adding the additional value to the weighted predicted sample value, resulting in a non-normalized predicted sample value; and
 normalizing the non-normalized predicted sample value by an arithmetic right shift of an integer representation of the non-normalized predicted sample value, resulting in a normalized predicted sample value.

A second aspect of a method according to the first aspect, wherein the picture is part of a video sequence.

A third aspect of a method according to the first or second aspect, wherein normalizing the non-normalized predicted sample value comprises computing the normalized predicted sample value as $$\hat{P}(x,y)=(wL \times R_{-1,y}+wT \times R_{x,-1}+(64-wL-wT) \times P(x,y)+32))>>6$$

where
 $\hat{P}(x,y)$ is the normalized predicted sample value,
 $P(x,y)$ is the non-normalized predicted sample value,
 $R_{x,-1}$, $R_{-1,y}$ represent the values of the nearest reference samples located above and to the left of the each sample,
 $wL=V>>((x<<1)>>nScaleX)$ is a horizontal weighting factor,
 $wT=V>>((y<<1)>>nScaleY)$ is a vertical weighting factor,
 x is a horizontal coordinate of the sample, and
 y is a vertical coordinate of the sample.

A fourth aspect of a method according to any one of the previous aspects, wherein each sample is not updated if a sum of a width of the block and a height of the block is greater than 64 samples and either intraPredMode is skew non-diagonal or it is equal to PLANAR_IDX.

A fifth aspect of an encoder comprising processing circuitry for carrying out the method according to any one of the first to fourth aspects.

A sixth aspect of a decoder comprising processing circuitry for carrying out the method according to any one of the first to fourth aspects.

A seventh aspect of a computer program product comprising a program code for performing the method according to any one of the first to fourth aspects.

An eighth aspect of a decoder, comprising:
 one or more processors; and
 a non-transitory computer-readable storage medium coupled to the processors and storing programming for execution by the processors, wherein the programming, when executed by the processors, configures the decoder to carry out the method according to any one of the first to fourth aspects.

A ninth aspect of an encoder, comprising:
 one or more processors; and
 a non-transitory computer-readable storage medium coupled to the processors and storing programming for execution by the processors, wherein the programming, when executed by the processors, configures the encoder to carry out the method according to any one of the first to fourth aspects.

The invention claimed is:

1. A method of intra predicting a block of a picture, the method comprising:
 for each sample from a plurality of samples of the block,
 determining a predicted sample value from one or more reference sample values by intra-prediction using a DC intra-prediction mode;
 determining a vertical weighting factor based on the intra prediction mode and one of a height of the block, a width of the block, or both;
 determining a horizontal weighting factor based on the intra prediction mode and one of the height of the block, the width of the block, or both;
 calculating an additional value, wherein the additional value is derived as $wL \times R_{-1,y}+wT \times R_{x,-1}$, wherein wT is the vertical weighting factor and wL is the horizontal weighting factor, wherein $R_{x,-1}$ represents a value of nearest reference samples located above the each sample and $R_{-1,y}$ represents a value of nearest reference samples located to the left of the each sample;
 multiplying the predicted sample value by a sample weighting factor, resulting in a weighted predicted sample value;
 adding the additional value to the weighted predicted sample value, resulting in a non-normalized modified predicted sample value, wherein the non-normalized modified predicted sample value is without a weighting factor of the top-left reference sample $R_{-1,-1}$; and
 normalizing the non-normalized modified predicted sample value by an arithmetic right shift of an integer representation of the non-normalized modified predicted sample value, resulting in a normalized modified predicted sample value.

2. The method according to claim 1, wherein the picture comprises the each sample of the plurality of samples of the block.

3. The method according to claim 1, wherein
 determining the vertical weighting factor comprises:
  determining a first scaling factor based on the intra prediction mode and one of the height of the block, the width of the block, or both, and
  determining the vertical weighting factor based on the first scaling factor;
 determining the horizontal weighting comprises:
  determining a second scaling factor based on the intra prediction mode and one of the height of the block, the width of the block, or both, and determining the horizontal weighting based on the second scaling factor.

4. The method according to claim 1, wherein
determining the vertical weighting factor comprises determining a vertical scaling factor (nScaleY) based on the height of the block and the intra prediction mode, and determining the vertical weighting factor based on the vertical scaling factor (nScaleY);
determining the horizontal weighting comprises determining a horizontal scaling factor (nScaleX) based on the width of the block and the intra prediction mode, and determining the horizontal weighting based on the horizontal scaling factor (nScaleX).

5. The method of claim 4, wherein the nScaleX and the nScaleY are respectively derived depending on a mode class index, wherein the mode class index is derived using a group of intra prediction modes.

6. The method according to claim 5, wherein the mode class index is mapped to the group of intra prediction modes according to one of the following tables:

| Group of intra prediction modes | 2, DC_IDX, HOR_IDX, | VDIA_IDX | Other modes |
|---|---|---|---|
| Class index | 1 | 2 | 0 | or

| Group of intra prediction modes | DC_IDX, HOR_IDX, VER_IDX | 2, VDIA_IDX | Other modes |
|---|---|---|---|
| Class index | 1 | 2 | 0 | or

| Group of intra prediction modes | DC_IDX, HOR_IDX, VER_IDX | 2, VDIA_IDX | Other modes |
|---|---|---|---|
| Class index | 2 | 1 | 0 | or

| Group of intra prediction modes | DC_IDX, HOR_IDX, VER_IDX | Diagonal modes with integer subpixel step: −14 −12 −10 −6, 2, VDIA_IDX, 72, 76, 78, 80 | Other modes |
|---|---|---|---|
| Class index | 2 | 1 | 0 | wherein DC_IDX is a DC mode having an intra prediction mode index of 1, HOR_IDX and VER_IDX are horizontal and vertical modes having intra prediction mode indices of 18 and 50, respectively, VDIA_IDX is a diagonal mode having an intra prediction mode index of 66.

7. The method according to claim 4, wherein the nScaleX and the nScaleY are derived according to the following mapping:

| Class index | Derivation method |
|---|---|
| 0 | nScaleX = (Log2(nTbW) − 2 + 1) >> 1<br>nScaleY = (Log2(nTbH) − 2 + 1) >> 1 |
| 1 | nScaleY = nScaleX = (Log2(nTbH) + Log2(nTbW)) > 6 ? 1: 0 |
| 2 | nScaleX = Log2(nTbW) > 3 ? 1: 0<br>nScaleY = Log2(nTbH) > 3 ? 1: 0 | wherein nTbW and nTbH are width and height of the predicted block, respectively;

>> is a right-shift operation;

Log 2 returns a natural logarithm of a number to a base 2.

8. The method according to claim 5, wherein the mode class index is mapped to the group of intra prediction modes according to the following table:

| Group of intra prediction modes | predModeIntra > 50 | predModeIntra < 18 && predModeIntra! = 0 && predModeIntra! = 1 | Other modes |
|---|---|---|---|
| Class index | 1 | 2 | 0 |

9. The method according to claim 8, wherein the nScaleX and the nScaleY are derived according to the following mapping:

| Class index | Derivation method |
|---|---|
| 0 | nScaleY = nScaleX = (Log2(nTbH) + Log2(nTbW) − 2) >> 2 |
| 1 | nScaleY = nScaleX = Min(2, Log2(nTbH) − Floor(Log2(3 * invAngle − 2)) + 8) |
| 2 | nScaleY = nScaleX = Min(2, Log2(nTbW) − Floor(Log2(3 * invAngle − 2)) + 8) Log2(nTbH) > 3 ? 1: 0 | wherein nTbW and nTbH are width and height of the predicted block, respectively;

>> is a right-shift operation;

Floor is a floor function;

Log 2 returns a natural logarithm of a number to a base 2;

Min returns a smallest of its arguments;

invAngle is an inverse angle parameter derived using intraPredAngle as follows:

$$invAngle = \text{Round}\left(\frac{512*32}{intraPredAngle}\right);$$

wherein intraPredAngle is an angle parameter derived from the intra prediction mode, given by variable predModeIntra using a lookup table (LUT).

10. The method according to claim 9, wherein the LUT is given by the following table:

| predMode Intra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPred Angle | 512 | 341 | 256 | 171 | 128 | 102 | 86 | 73 | 64 | 57 | 51 | 45 | 39 | 35 | 32 | 29 | 26 |
| predMode Intra | 5 | 6 | 7 | 8 | 9 | 10 | 11 | 12 | 13 | 14 | 15 | 16 | 17 | 18 | 19 | 20 | 21 |
| intraPred Angle | 23 | 20 | 18 | 16 | 14 | 12 | 10 | 8 | 6 | 4 | 3 | 2 | 1 | 0 | −1 | −2 | −3 |
| predMode Intra | 22 | 23 | 24 | 25 | 26 | 27 | 28 | 29 | 30 | 31 | 32 | 33 | 34 | 35 | 36 | 37 | 38 |
| intraPred Angle | −4 | −6 | −8 | −10 | −12 | −14 | −16 | −18 | −20 | −23 | −26 | −29 | −32 | −29 | −26 | −23 | −20 |
| predMode Intra | 39 | 40 | 41 | 42 | 43 | 44 | 45 | 46 | 47 | 48 | 49 | 50 | 51 | 52 | 53 | 54 | 55 |
| intraPred Angle | −18 | −16 | −14 | −12 | −10 | −8 | −6 | −4 | −3 | −2 | −1 | 0 | 1 | 2 | 3 | 4 | 6 |
| predMode Intra | 56 | 57 | 58 | 59 | 60 | 61 | 62 | 63 | 64 | 65 | 66 | 67 | 68 | 69 | 70 | 71 | 72 |
| intraPred Angle | 8 | 10 | 12 | 14 | 16 | 18 | 20 | 23 | 26 | 29 | 32 | 35 | 39 | 45 | 51 | 57 | 64 |
| predMode Intra | 73 | 74 | 75 | 76 | 77 | 78 | 79 | 80 | | | | | | | | | |
| intraPred Angle | 73 | 86 | 102 | 128 | 171 | 256 | 341 | 512 | | | | | | | | | |

11. The method according to claim 4, wherein normalizing the non-normalized modified predicted sample value comprises computing the normalized modified predicted sample value as $$\hat{P}(x,y)=(wL \times R_{-1,y}+wT \times R_{x,-1}+(64-wL-wT) \times P(x,y)+32))>>6$$

wherein $\hat{P}(x,y)$ is the normalized modified predicted sample value, $P(x,y)$ is the non-normalized modified predicted sample value, $R_{x,-1}$, $R_{-1,y}$ represent values of nearest reference samples located above and to the left of the each sample, $wL=V>>((x<<1)>>nScaleX)$ is a horizontal weighting factor, $wT=V>>((y<<1)>>nScaleY)$ is a vertical weighting factor, V is a base value;

x is a horizontal coordinate of the each sample, and y is a vertical coordinate of the each sample.

12. The method according to claim 1, wherein the intraPredMode is skew non-diagonal if the intraPredMode is not equal to 2 or VDIA_IDX, and one of the following is true: the intraPredMode is not less than VDIA_IDX−numModes or intraPredMode is not greater than 2+numModes, wherein VDIA_IDX is a diagonal mode having an intra prediction mode index, wherein the numModes is a predefined parameter with a preset value.

13. The method according to claim 1, further comprising adding a residual value to the normalized modified predicted sample value, resulting in a reconstructed sample value.

14. An encoder comprising processing circuitry for performing the method according to claim 1.

15. A decoder comprising processing circuitry for performing the method according to claim 1.

16. A decoder, comprising:
one or more processors; and
a non-transitory computer-readable storage medium coupled to the one or more processors and storing programming instructions, which when executed by the one or more processors, cause the decoder to perform the method according to claim 1.

17. An encoder, comprising:
one or more processors; and
a non-transitory computer-readable storage medium coupled to the one or more processors and storing programming instructions, which when executed by the one or more processors, cause the encoder to perform the method according to claim 1.

* * * * *